United States Patent
Brittain et al.

(10) Patent No.: US 11,585,762 B2
(45) Date of Patent: Feb. 21, 2023

(54) VIRTUAL CAMERA ARRAY FOR INSPECTION OF MANUFACTURED WEBS

(71) Applicant: 3M INNOVATIVE PROPERTIES COMPANY, St. Paul, MN (US)

(72) Inventors: Kenneth G. Brittain, Cottage Grove, MN (US); Steven P. Floeder, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 144 days.

(21) Appl. No.: 16/965,647

(22) PCT Filed: Jan. 28, 2019

(86) PCT No.: PCT/IB2019/050678
§ 371 (c)(1),
(2) Date: Jul. 29, 2020

(87) PCT Pub. No.: WO2019/150243
PCT Pub. Date: Aug. 8, 2019

(65) Prior Publication Data
US 2021/0041373 A1    Feb. 11, 2021

Related U.S. Application Data

(60) Provisional application No. 62/624,272, filed on Jan. 31, 2018.

(51) Int. Cl.
*G01N 21/89*    (2006.01)
*G06T 7/00*    (2017.01)
(Continued)

(52) U.S. Cl.
CPC ....... *G01N 21/8903* (2013.01); *G06T 7/0006* (2013.01); *H04N 5/23229* (2013.01);
(Continued)

(58) Field of Classification Search
CPC ........ B41F 33/0036; G01N 2021/8909; G01N 21/8903; G06T 2207/10008;
(Continued)

(56) References Cited

U.S. PATENT DOCUMENTS 2,801,185 A    7/1957    Iler
3,347,954 A    10/1967   Bredereck
(Continued)

FOREIGN PATENT DOCUMENTS

CN    103049413    4/2013
DE    3639636      5/1988
(Continued)

OTHER PUBLICATIONS

Arbuzov, "Structure of reaction products of some α,β-unsaturated carbonyl compounds with trimethyl phosphite and tri(demethylamino) phosphine", Organic and biological chemistry, pp. 819-824.
(Continued)

*Primary Examiner* — Dakshesh D Parikh
(74) *Attorney, Agent, or Firm* — Sriram Srinivasan

(57) ABSTRACT

System and methods used to inspect a moving web (112) include a plurality of image capturing devices (113) that image a portion of the web at an imaging area. The image data captured by each of the image capturing devices at the respective imaging areas is combined to form a virtual camera data array (105) that represents an alignment of the image data associated with each of the imaging areas to the corresponding physical positioning of the imaging areas relative to the web. The image output signals generated by each of the plurality of image capturing devices may be processed by a single image processor, or a number of image processors (114) that is less than the number of image capturing devices. The processor or processors are arranged to generate the image data forming the virtual camera array.

16 Claims, 9 Drawing Sheets

(51) Int. Cl.
*H04N 5/232* (2006.01)
*H04N 5/247* (2006.01)

(52) U.S. Cl.
CPC ..... *H04N 5/247* (2013.01); *G01N 2021/8909* (2013.01); *G06T 2207/10016* (2013.01); *G06T 2207/20221* (2013.01); *G06T 2207/30124* (2013.01)

(58) Field of Classification Search
CPC . G06T 2207/10016; G06T 2207/20221; G06T 2207/30124; G06T 3/4038; G06T 7/0006; H04N 5/23229; H04N 5/247
See application file for complete search history.

(56) References Cited

U.S. PATENT DOCUMENTS

| | | | |
|---|---|---|---|
| 3,496,250 A | 2/1970 | Czerwinski | |
| 4,503,169 A | 3/1985 | Randklev | |
| 4,522,958 A | 6/1985 | Das | |
| 4,744,035 A * | 5/1988 | Hashim | D06H 3/16 209/939 |
| 5,657,402 A | 8/1997 | Bender | |
| 5,920,657 A | 7/1999 | Bender | |
| 6,586,483 B2 | 7/2003 | Kolb | |
| 7,074,839 B2 | 7/2006 | Fansler | |
| 7,090,721 B2 | 8/2006 | Craig | |
| 7,090,722 B2 | 8/2006 | Budd | |
| 7,156,911 B2 | 1/2007 | Kangas | |
| 7,235,775 B2 | 6/2007 | Masaki | |
| 7,342,047 B2 | 3/2008 | Lewandowski | |
| 7,542,821 B2 | 6/2009 | Floeder | |
| 7,598,298 B2 | 10/2009 | Lewandowski | |
| 7,623,699 B2 | 11/2009 | Floeder | |
| 7,649,029 B2 | 1/2010 | Kolb | |
| 7,797,133 B2 | 9/2010 | Floeder | |
| 7,974,459 B2 | 7/2011 | Floeder | |
| 9,322,786 B2 | 4/2016 | Takami | |
| 9,719,939 B2 | 8/2017 | Krebs | |
| 2004/0123963 A1* | 7/2004 | Chen | B41M 3/006 162/134 |
| 2004/0163562 A1* | 8/2004 | Lewis, Jr. | B41F 33/0081 101/485 |
| 2006/0071156 A1 | 4/2006 | Masaki | |
| 2007/0057208 A1 | 3/2007 | Joss | |
| 2009/0159799 A1 | 6/2009 | Copeland | |
| 2011/0043691 A1 | 2/2011 | Guitteny | |
| 2011/0069878 A1* | 3/2011 | Case | G01N 21/8806 382/152 |
| 2015/0077538 A1* | 3/2015 | Krebs | B41F 33/0036 348/88 |
| 2015/0221077 A1* | 8/2015 | Kawabata | G06T 7/337 382/141 |
| 2015/0284601 A1 | 10/2015 | Yurt | |
| 2016/0155030 A1* | 6/2016 | Blank | G06K 15/022 358/1.2 |
| 2016/0185993 A1 | 6/2016 | Yoshida | |
| 2016/0369115 A1 | 12/2016 | Shimoju | |

FOREIGN PATENT DOCUMENTS

| | | | |
|---|---|---|---|
| DE | 102012101310 | 4/2013 | |
| EP | 0052813 | 6/1982 | |
| EP | 1348946 | 10/2003 | |
| EP | 1712897 | 10/2006 | |
| EP | 2177947 | 4/2010 | |
| EP | 2208355 | 7/2010 | |
| JP | 63290867 | 11/1988 | |
| WO | WO 2007-140440 | 12/2007 | |
| WO | WO 2008-024611 | 2/2008 | |
| WO | WO 2009-014940 | 1/2009 | |
| WO | WO 2014-078115 | 5/2014 | |
| WO | WO 2014-151650 | 9/2014 | |
| WO | WO 2014-172530 | 10/2014 | |
| WO | WO 2015-200007 | 12/2015 | |
| WO | WO 2016-014218 | 1/2016 | |
| WO | WO 2016-044151 | 3/2016 | |
| WO | WO 2016-053877 | 4/2016 | |
| WO | WO 2016-137317 | 9/2016 | |
| WO | WO-2016198242 A1 * | 12/2016 | ............ G08G 1/015 |
| WO | WO 2017-095704 | 6/2017 | |
| WO | WO 2018-215889 | 11/2018 | |
| WO | WO 2019-150242 | 8/2019 | |
| WO | WO 2019-152187 | 8/2019 | |
| WO | WO 2019-152267 | 8/2019 | |

OTHER PUBLICATIONS

Klan, "Photoremovable Protecting Groups in Chemistry and Biology: Reaction Mechanisms and Efficiency", Chem Reviews, 2013, vol. 113, pp. 119-191.

Matyjaszewski, "Atom transfer radical polymerization", Chem. Rev., 2001, vol. 101, pp. 2921-2990.

Pelliccioli, "Photoremovable protecting groups: reaction mechanisms and applications", Photochem Photobiol Sci.,2002, vol. 1, pp. 441-458.

Seibert, "Flat field correction technique for digital detectors", Medical Imaging 1998: Physics of medical imaging, 1998, vol. 3336, pp. 348-354.

Senda, "Uracil derivatives and related compounds IX Synthesis of Bucolomes related compounds" 1969, vol. 89, pp. 266-271.

Sidky, "Organophosphorous compounds. XXV Reactivity of Benzlidenebarbituric Acid Towards Tervalent Phosphorous Compounds" Egypt J. Chem, 1978, vol. 21, No. 1, pp. 37-46.

Wu, "Mode of Action of 4-Hydroxyphenylpyruvate Dioxygenase Inhibition by Triketone-type Inhibitors", J. Med. Chem., 2002, vol. 45, pp. 2222-2228.

Xu, "Industrial web inspection for manufacturing process understanding and control", Machine vision application in industrial inspection, 1999, vol. 3652, pp. 10-20.

Yong, "Photochemistry of 2-Nitrobenzyl Enol Ethers: Oxidative C=C Bond Scission", Org. Lett., 2005, vol. 7, No. 12, pp. 2485-2487.

International Search report for PCT International Application No. PCT/IB2019/050678 dated Jun. 14, 2019, 6 pages.

* cited by examiner

VIRTUAL CAMERA ARRAY FOR INSPECTION OF MANUFACTURED WEBS

CROSS REFERENCE TO RELATED APPLICATIONS

This application is a national stage filing under 35 U.S.C. § 371 of PCT/IB2019/050678, filed Jan. 28, 2019, which claims the benefit of Provisional Application No. 62/624,272, filed Jan. 31, 2018, the disclosure of which is incorporated by reference in its/their entirety herein.

BACKGROUND

Manufacturing processes for making various types of roll good products, such as polyester films, paper, and metals, often involve manufacturing the products in a long continuous sheet(s), referred to as a web. The web itself is generally a material having a fixed dimension in one direction ("cross-web direction" or "width dimension"), either a predetermined or indeterminate length in the orthogonal direction ("down-web direction" or "length dimension" or "machine direction"), and a nominal thickness dimension between a top and a bottom exterior planar surface of the web. During the various manufacturing processes used in making and handling the web, the web may be conveyed along a longitudinal axis running in parallel to the length dimension (down-web direction) of the web, and perpendicular to the width dimension (cross-web direction) of the web. Various means are used to convey the web during the manufacturing process, such as rollers or other types of support mechanisms.

At some point in the process of manufacturing the final product where the web is utilized, the web may be partitioned into individual portions of the web material to form "parts" from the web. The parts may include pieces of the web material having a shape, such as a rectangular-shaped perimeter, and may or may not include cutout portions that are void of the web material formed within the shape. Once converted from the web material, the part may be applied to a device, such as a computer monitor screen or a display screen of a mobile device, such as a smart phone, for example as a film layer that may cover some portion of an exterior surface of the device.

Depending on the particular application, each individual piece of the web material, or in some embodiments the entirety of the web, may need to comply with one or more criteria related to certain physical and/or functional characteristics associated with the web product. For example, qualities related to surface imperfections such as machine line defects, anomalies such as bubbles or other irregularities within the web, and qualities related to patterns printed onto or incorporated within the web, may be examples of quality and/or performance characteristics of the web that may be dictated and/or required by a customer and/or by other regulatory requirements, such as governmental safety regulations. These quality and/or performance characteristics may be applicable to each piece of the web material that is eventually rendered into a final product (e.g., a part) for a particular application where the web product is being used, or may apply to the web in its entirety. Various types and/or levels of inspection of the web material itself, or of the individual portions of the web material that are to be utilized in the final products, may need to be performed on the web material and/or on the individual pieces of the web material that will be or are already converted into a part to assure and/or certify compliance to these customer and/or regulatory requirements.

In a traditional web inspection system, a multi-camera inspection system may be used to image portions of a web extending across a cross-web dimension of the web being inspected. Each camera of the multi-camera inspection system is coupled to an individual image processor of a computing device, wherein only a fraction of the total available processor capability is actually being utilized to process the captured image data. These traditional arrangements may lend to wasted capacity of the image processors capacity, added expense, and lack of flexibility in the ability to configure the inspection system(s) for inspection of different types of webs and/or for different characteristics that are being measured or tested for with respect to the web undergoing the imaging process.

SUMMARY

The systems, devices, and methods described herein include arrangements for imaging of a manufactured web using a plurality of image capturing devices, (e.g., cameras), wherein the image data that that is captured by the plurality of image capturing devices is combined to form a "virtual camera data array" including image data from each of the plurality of image capturing devices spatially synchronized to the specific physical locations of the web where each image capturing device imaged the web. The virtual camera data array may be generated in some embodiments by a single image processor, or a number of image processors that is less than the number of the image capturing devices providing the image data used to form the virtual camera data array. This technique may provide more efficient use of the available processing capacity of the processor(s) use to process the image data, thus maximizing processor efficiency and reducing cost. Image data provided by the image capturing devices may include imaged portions of the web that overlap, and processing of the image data to generate the virtual camera data array may include processing to remove redundant (duplicate) data, and other processing procedures used to prepare the virtual camera data array for further analysis. The combining of the image data captured by a plurality of image capturing devices into a single virtual camera data array may simplify the analysis of the data, for example, used to detect defects in the web, and to determine one or more statuses associated with the imaged web. In addition, the use of a single virtual camera data array that is formed for the image data captured by a plurality of image capturing devices imaging a web, in some embodiments as the web is continuously advanced past the image capturing devices, allows for analysis of various aspect of the web, such as patterns associated with the web, that might otherwise be more difficult or impossible to analyze based on the individual image data provided by each image capturing device.

As one example, the disclosure is directed to a method for inspecting a web, the method comprising imaging, by each of a plurality of image capturing devices, a plurality of imaging areas extending across a cross-web dimension of the web while the web is advanced along a down-web dimension of the web, and generating, by the plurality of image capturing devices, image output signals comprising image data captured by each of the plurality of image capturing devices and corresponding respectively to each of the plurality of imaging areas of the web. The method further includes aligning, by processing circuitry, the image data captured for the plurality of imaging areas in the cross-web dimension to generate image data corresponding to a virtual image area of the web that extends across the cross-web dimension of the web at a same down-web dimensional position of the web, and combining, by the processing circuitry, the image data from the plurality of imaging areas to remove redundant data from the virtual image area and to generate a virtual camera array corresponding to image data captured from the plurality of imaging areas of the web. The method also includes analyzing, by at least one inspection system, the virtual camera array to determine at least one inspection status for the web.

As another example, the disclosure is directed to a system for inspecting a web, the system comprising an imaging station configured to advance the web through a processing line in a down-web dimension of the web past an imaging station, and a plurality of image capturing devices positioned at the imaging station and configure to image a plurality of imaging areas extending in a cross-web dimension of the web while the web is advanced through the imaging station along the down-web dimension, and to generate image output signals comprising image data captured by each of the plurality of image capturing devices and corresponding respectively to each of the plurality of imaging areas of the web. The system also includes a processing circuitry configured to aligning the image data captured for the plurality of imaging areas in the cross-web dimension to generate image data corresponding to a virtual image area of the web that extends across the cross-web dimension of the web at a same down-web dimensional position of the web, and to combine the image data from the plurality of imaging areas to remove redundant data from the virtual image area and to generate a virtual camera array corresponding to image data captured from the plurality of imaging areas of the web. The system also includes at least one inspection system configured to analyze the virtual camera array to determine at least one inspection status for the web.

As another example, the disclosure is directed to a method for inspecting a web including a printed pattern on the web, the method comprising imaging, by each of a plurality of image capturing devices, a plurality of imaging areas extending across a cross-web dimension of the web and along an imaging row in a down-web dimension while the web is advanced in a processing line along a down-web dimension of the web and generating, by the plurality of image capturing devices, image output signals comprising image data captured by each of the plurality of image capturing devices and corresponding to each of the plurality of imaging areas of the web extending along the imaging rows for each of the image capturing devices. The method further includes aligning, by processing circuitry, the image data captured for the plurality of imaging areas that align with one another in the cross-web dimension to generate image data corresponding to a virtual image area of the web that extends across the cross-web dimension of the web at a same down-web dimensional position of the web and that aligns the image data corresponding to the printed pattern of the web in a same relative position as the printed pattern on the web, and combining, the processing circuitry, the image data from the plurality of imaging areas to remove redundant data from the virtual image area and to generate a virtual camera array corresponding to image data captured from the plurality of imaging areas of the web. The method also includes analyzing, by at least one inspection system, the virtual camera array to determine at least one inspection status for the printed pattern included with the web.

Figure 1:
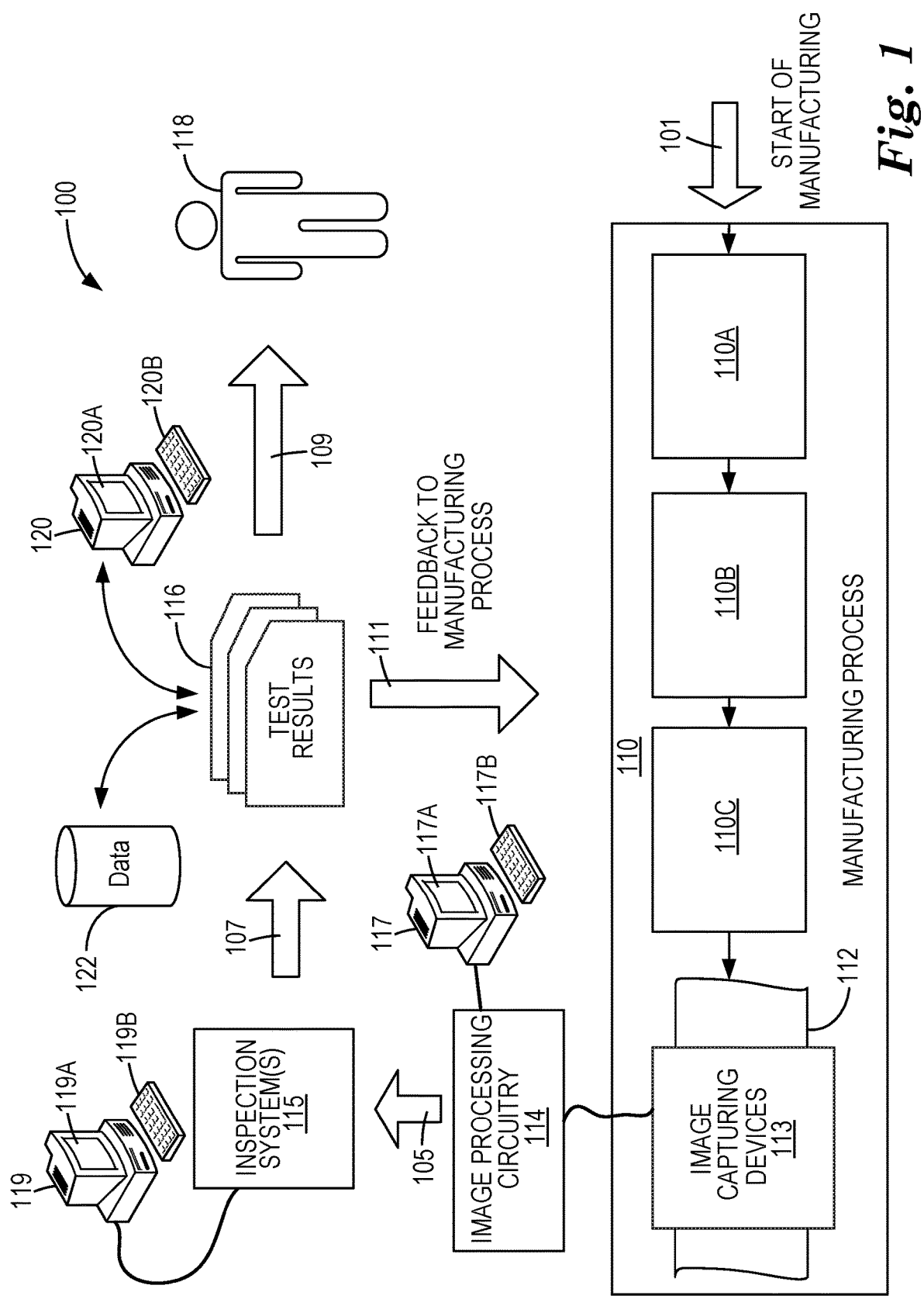
FIG. 1 is a functional block diagram illustrating an overview of a system for manufacturing a web product, and for imaging and inspecting the web product in accordance with one or more exemplary implementations and techniques described in this disclosure.

The drawings and the description provided herein illustrate and describe various embodiments of the inventive methods, devices, and systems of the present disclosure. The methods, devices, and systems of the present disclosure are not limited to the specific embodiments as illustrated and described herein, and other embodiments and variations of the methods, devices, and systems of the present disclosure, as would be understood by one of ordinary skill in the art, are contemplated as being within the scope of the present application.

DETAILED DESCRIPTION

The systems, devices, and methods described herein provide techniques for inspection of a manufactured web product (e.g., a film) at high speeds (e.g., while the web is continuously moving through an imaging station including a plurality of image capturing devices), and which may be configured to image large portions (e.g., 100%) of the web during some stage in the manufacturing of the web, and/or to image individual sheets of the web in some embodiments. The image capturing devices may include devices, such as electronic cameras, that are arranged at the imaging station, each image capturing device capturing image data corresponding to an imaging area along some portion of the web, which may extend along some portion of the cross-web dimension of the web. Depending on the physical positioning and/or the imaging configuration of each of the image capturing devices, the individual image output signals generated by each of the image capturing devices may align and overlap across a cross-web dimension of the web, or may form a staggered pattern along a down-web dimension of the web.

The image output signals generated by each of the image capturing devices while imaging the web passing through the imaging station are output to image processing circuitry that performs processing of the image data included in the electronic signals. Processing of the image data includes electronically aligning the image data included in the image output signals, and removing redundant image data to form a virtual camera data array, or simply referred to as a "virtual camera array." The virtual camera array includes image data corresponding to the imaged areas of the web as imaged by the image capturing devices, but arranged in a proper alignment and order corresponding to the cross-web and the down-web dimensions of the imaged areas of the web along the web. The image processing circuitry is arranged to spatially synchronize the image data within the virtual camera array to the physical location of the web where the image data was captured so that the image data formed as the virtual camera array can be located and associated with the corresponding physical location of the imaged areas of the web relative to the cross-web and the down-web dimensions of the web.

The processing circuitry may also perform one or more pre-processing operations, such as one-dimensional or two-dimensional convolutions, ranked filtering, contrast enhancement, static flat-field correction, and/or frequency processing on the image data included in the virtual camera array before outputting virtual camera array for inspection analysis. Once the virtual camera array has been generated from the image output signals, and any pre-processing has been completed, a variety of types of analysis techniques may be performed on the image data included in the virtual camera array to provide inspection status(es) for the imaged portions of the web. Analysis of the virtual camera array may be performed by at least one inspection system, and the types of analysis performed on the image data included within the virtual camera array may be directed to making at least one status determination related to the quality and/or performance characteristics that are required of the finished product or by the final application to which the web is to be applied.

Inspection of the web using the devices, systems, and methods described herein may include inspection of patterned webs, for example, inspection of patterns printed on a surface of the web, or otherwise incorporated into the web material. The patterns may represent patterns included with parts that may ultimately be converted from the web material as separate parts formed from the converted portions of the web. The inspection of the web may include inspection of individual patterns that extend across image areas being imaged by two or more different image capturing devices. Once the image data representative of the pattern(s) has been captured and formed into the virtual camera array, analysis of conformance of the patterns to various requirements, such as measurements related to pattern conformity and/or spatial dimensions of the patterns may be made, and statuses may be assigned to the various portions of the web based on these measurements, for example, to determine which patterns may be converted to form "good" parts, and which patterns may include defects in the pattern that would lead to generation of a "bad" part if converted from the web based on one or more measured criteria associated with the patterns and/or the web material itself.

These techniques also provide a suitable implementation for use in online manufacturing applications where the techniques described in this disclosure can provide real time feedback to the manufacturing process producing the web to troubleshoot and/or improve the manufacturing process by reducing defects in the web. For example, the results of the analysis of the web may be used to control further manufacturing operations that may be producing the web being inspected. Analysis of the data included in the virtual camera array may be used to locate defects and/or to determine statuses associated with the imaged web. Such feedback may be utilized to alter or better control the manufacturing process producing the web, and thus reduce or eliminate one or more defects in the web, and increase yield. The inspection of the web may also provide data for automatic control of a conversion process used to convert (e.g., cut and/or separate) portions of the web determined to be "good" or that otherwise meeting the requirements for a part based on the analysis of the virtual camera array generated by imaging the web and the analysis of the image data provided as the virtual camera array.

FIG. 1 is a functional block diagram illustrating an overview of system 100 for manufacturing a web, and for imaging and inspecting the web in accordance with one or more exemplary implementations and techniques described in this disclosure. System 100 includes apparatus for manufacturing a web, and for inspecting the manufactured web using image data captured by a plurality of image capturing devices (not specifically shown in FIG. 1, but for example image capturing devices 141, 143, 145, and 147 in FIGS. 2-6) to generate a virtual camera data array ("virtual camera array") including image data captured by imaging the web using the image capturing devices. The image data included within the virtual camera array may be analyzed by at least one inspection system 115 to inspect and measure characteristics of the web, patterns of the web, and/or to determine one or more statuses for portions of the web and/or the web of the web in its entirety.

Initially, manufacturing process 110 as shown in FIG. 1 receives various inputs 101 (e.g., material, energy, people, machinery), and applies manufacturing processes 110A, 110B, and 110C, to produce an output including web 112. Manufacturing process 110 is not limited to any particular type or form of manufacturing, and is illustrative of any type of manufacturing process operable to produce a web that may include transparent or semi-transparent films, single or multiple layer webs, and any type of web that may include a pattern printed on the web or otherwise incorporated into the web.

Web 112 as provided by manufacturing process 110 may include a web having a nominal thickness dimension between a top surface and a bottom surface of the web, and a predetermined width dimension extending across and perpendicular to the thickness dimension. In some embodiments, the nominal thickness of the web is in a range from 50-300 micrometers, although the thickness dimension of web 112 is not limited to this range of thicknesses, and may have a thickness dimension that is greater or less than this range of thicknesses. The width dimension of web 112 in the cross-web direction may be in a range from 12-36 inches, although the width dimension of web 112 is not limited to this range of widths, and may have a width (cross-web) dimension that is greater or less than this range of widths. Web 112 may have a predetermined length, in most instances that can be many times longer than the width dimension, or can be provided from manufacturing process 110 in a continuous length, in either case which can be referred to as a web. In some embodiments, web 112 comprises a single layer of transparent or semi-transparent material, or may include a web having a plurality of layers of materials. Web 112 may comprise transparent or semi-transparent material intended to provide particular levels of light transmission, generally through the thickness dimension of the web, for a particular wavelength of light or for a range of wavelengths of light. The web may have various requirements related to the flatness of the top and/or bottom surfaces of the web, and/or related to the lack of imperfections, such as dents, lumps, machine line defects, and other type of irregularities in the physical dimensions of the web. The web may include a pattern incorporated within the web, and/or patterns that may be printed onto a surface or embedded with the web, and there may be one or more requirements related to these patterns, such as how and/or where these patterns are formed on or within the web, and/or requirements related to shapes, dimensions, and/or colors of the patterns.

System 100 may provide web 112 produced by manufacturing process 110 to an imaging station including image capturing devices 113. Image capturing devices 113 of the imaging station may include a plurality of image capturing devices, generally but not limited to electronic cameras, or simply "cameras." The cameras may be arranged at the imaging station so that each camera is arranged to image an area of web 112 as the web is advanced through the imaging station. In some embodiments, web 112 is provided to the imaging station on a continuous basis and in real time as the web is being manufactured by manufacturing process 110. In other embodiments, web 112 is provided to the imaging station at some time after being manufactured, for example, after web 112 is stored in a roll, or in the form of individual sheets that web 112 may be cut to form.

Web 112 being imaged at the imaging station by image capturing devices 113 may be advancing on a continuous basis as a one-thickness layer of web 112 moving through the inspection station, and thus moving portions of the layer of the web into and out of the imaging areas of the cameras along a dimension of the web that corresponds to the direction of advancement of the web. Manufacturing process 110 and/or the imaging station may include devices (not specifically shown in FIG. 1) configured to advance web 112 along the longitudinal axis of the web so that portions, such as a width-wise portions of the web, may be moved into and out of the imaging area of image capturing devices 113 located at the imaging station. As the web passes through the imaging areas, each of image capturing devices 113 captures image data associated with the portion of web 112 presented in the imaging area associated with that particular image capturing device. The captured image data from each of image capturing devices 113 is forwarded, either as raw video data or some other form of electrical signals representative of the captured image data, to image processing circuitry 114.

Image processing circuitry 114 is not limited to any particular type of image processing circuitry, and may include any type of image processing circuitry that can be configured to receive image data, and to process the data to generate a virtual camera array as further described below. In some embodiments, image processing circuitry 114 includes some number of processor or microprocessors that is less than the number of image capturing devices 113 providing image data to the image processing circuitry, and, in some embodiments, may include only a single processor or microprocessor.

Image processing circuitry 114 may include or be coupled to at least one computing device, such as computing device 117. Computing device 117 may include a computer monitor 117A, and at least one input device, such as keyboard 117B, that allows a system user, such as operator 118, to provide inputs to the image processing circuitry. Computer monitor 117A may provide a visual display of various types of information related to image capturing devices 113 and the generation of the virtual camera array. Inputs to image processing circuitry 114 provided via an input device, such as keyboard 117B, and/or programing executed by computing device 117 and/or image processing circuitry 114, may be used to provide inputs to configure and control image capturing devices 113, for example resolution settings and/or sample rates to be used by image capturing devices 113.

Image processing circuitry 114 receives the image data from each of image capturing devices 113, and combines the image data to form a virtual camera array that includes image data from each of image capturing devices 113, the image data electrically aligned to be spatially synchronized to the determined physical position of each of the imaged areas relative to the cross-web and the down-web dimensions of the web from where the image data was captured. Once the virtual camera array has been generated, the image data in the form of the virtual camera array may be output, as represented by arrow 105. The data including the virtual camera array may be stored in database 122 for later retrieval and analysis. The image data included in the virtual camera array may also be output to at least one inspection system 115 for analysis. Inspection system 115 is not limited to any particular type of inspection system, or to just a single inspection system, and may include any type of processing circuitry and/or computing devices, such as computing device 119, that may be programmed to analyze the data included in the virtual camera array provided by image processing circuitry 114 and/or retrieved from database 122.

For example, inspection system 115 may be configured to analyze the data included in the virtual camera array generated by image processing circuitry 114 to determine if and where any defects, such as machine line defects, bubbles, or other surface defects might exist in the inspected web. Inspection system 115 may also be configured to analyze the image data included in the virtual camera array to determine a status, or a plurality of statuses, such as a pass/fail status, that may be assigned to various portions of the web. Inspection system 115 may also be arranged to analyze image data within the virtual camera array related to patterns that may have been printed on or otherwise incorporated within the inspected web, and to determine a status or a plurality of status associated with the patterns of the web based on the image data included in the virtual camera array.

Any data generated through the analysis of the image data included in the virtual camera array by inspection system 115 may be forwarded (arrow 107) as test results 116, and/or also stored in database 122. In some embodiments, the virtual camera array provided by imaging processing circuitry 114 is provided in real time to inspection system 115, and analysis of the virtual camera array and the generated outputs provided through the analysis of the virtual camera array may be provided in real time, for example, at a display device such as computer monitor 119A of computing device 119. In other example, the data comprising a virtual camera array to be analyzed by inspection system 115 may be stored data that is retrieved, for example, from database 122, and the analysis of the image data in the virtual camera array is performed on the retrieved data by inspection system 115 at some time other than in real time relative to the generation of the virtual camera array. Computing device 119 may also include at least one input device, such as keyboard 119B, that allows a system user, such as operator 118, to provide inputs to inspection system 115 to control the analysis process and/or to control the format or other aspects of the outputs being generated by inspection system 115.

In other embodiments, the image data associated with the virtual camera array may be forwarded as an output from image processing circuitry 114 to another computing device 120, which may be a personal computer, for further processing by that computing device. Further processing of the signals received by computing device 120 may include analysis of the image data included in the virtual camera array to measure one or more physical and/or functional characteristics of the web, and/or to determine one or more statuses that may be assigned to portions of the web, or to the entirety of the web as imaged by image capturing devices 113. Test results 116 and/or information derived from the image data included in the virtual camera array may be utilized to generate graphical images that may be displayed on a display device, such as computer monitor 120A of computing device 120, and that may be visually presented to operator 118, as illustratively represented by arrow 109. The graphical image(s) may comprise an image, or stored data representative of the captured image data, that can be displayed and viewed, for example, on computer monitor 120A of computing device 120 by operator 118. In some embodiments, graphical representations of the data included in or derived from the virtual camera array may include graphs having two-dimensional X-Y axes depicting various characteristics or measured parameters associated with specific physical positions of the web along the cross-web and down-web dimensions of the web. For example, graphical depictions provided on computer monitor 120B may depict indications of the locations of one or more types of defects determined to exist in the web through the analysis of the image data in the virtual camera array. These indications of defects may be depictions of actual defects, such as machine line defects, bubbles or other anomalies in the web, or indications of status, such as a pass/fail status, based on application of one or more threshold values to one or more measured or determined characteristics derived by the analysis of the image data in the virtual camera array.

In some embodiments, test results 116 include information based on statistical analysis of the data associated with the virtual camera array, either in tabular format, or in a graphical format such as a graph illustrating a bell curve or other statistical distributions of the captured image data. Computing device 120 may be coupled to at least one input device, such as keyboard 120B, that allows a user, such as operator 118, to provide inputs to computing device 120, for example, to input threshold values used to determine status(es) of the web and/or to manipulate and control the presentation of the results generated through the analysis of the image data associated with the virtual camera array and the web.

In some embodiments, other information associated with the imaging of web 112 can be included in test results 116. For example, compliance of one or more patterns printed on or otherwise incorporated into the web with one or more pre-defined characteristics, such as positional and/or dimensional requirements, may be measured as part of test results 116. Test results 116 may include an indication of one or more statuses associated with web 112, or any portions of web 112, including patterns of the web, that may have been determined based on the analysis of the data included in the virtual camera array. In addition, information related to which shift of manufacturing process 110 made web 112, a date and/or time associated with the manufacturing of web 112, what raw materials and/or machines were used in the production of the web, and what the environmental conditions were, such as ambient temperature of the area where and when the web was manufactured, are examples of information that can be associated with web 112 and the image data included in the virtual camera array. The information included in test results 116 is not limited to any particular type of information, and can include any information or types of information deemed to be relevant to the web, image capturing devices 113, and/or inspection system 115 associated with the image data used in the generation of the virtual camera array.

System 100 includes one or more devices operable to store any of the information described above, including image data associated with a virtual camera array and/or test results 116, for example, as data stored in database 122, or in any other type of system or device operable to store test results and any other associated information in a retrievable format. In some embodiments, database 122 is an electronic database, located either on-site where manufacturing process 110 is taking place, or may be a remote database coupled to test results 116 via a network, such as the internet or through a local network. Database 122 may be implemented in any of a number of different forms including a data storage file or one or more database management systems (DBMS) executing on one or more database servers. The database management systems may be, for example, a relational (RDBMS), hierarchical (HDBMS), multidimensional (MDBMS), object oriented (ODBMS or OODBMS) or object relational (ORDBMS) database management system. In some embodiments, database 122 is implemented as a relational database available under the trade designation "SQL SERVER" from Microsoft Corporation, Redmond, Wash. In some embodiments, database 122 may also represent, at least in part, printed materials stored in a location, such as a file room.

In addition to storing the information, system 100 may include one or more mechanism, illustratively shown as arrow 111, to allow feedback to be provided to manufacturing process 110 based on test results 116 and/or input provided by an operator, such as operator 118, that may be based on or derived from test results 116. In some embodiments, test results 116 may be provided on a real-time basis as inspection system 115 is generating the results of the analysis being performed on a virtual camera array. Based on the test results and/or observations derived from the test results, feedback illustratively represented by arrow 111 may be provided to manufacturing process 110, for example, to adjust one or more parameters of inputs 101, or the parameters of manufacturing processes 110A, 110B, and/or 110C, in order to alter the output being provide as web 112. Feedback to manufacturing process may be used to troubleshoot manufacturing process 110 and/or to bring the output of web 112 into compliance with one or more characteristics being measured and evaluated by the imaging of the web. Thus, the test results provided by the generation and analysis of the image data in the virtual camera array not only allow inspection of the web itself as provided by manufacturing process 110, but may also be used in a close-loop manner to adjust manufacturing process 110 to reduce or eliminate defects in the web and to increase the overall yield of usable web begin produced through manufacturing process 110.

Especially when the generation and analysis of the image data and the virtual camera array is being provided in real time, the feedback from test results 116 to manufacturing process 110 may also occur in real time, which may result in the ability to quickly troubleshoot potential causes of defects and reduce the amount of defective web that may be generated by the manufacturing process had the feedback information not been available in real time.

Figure 2:
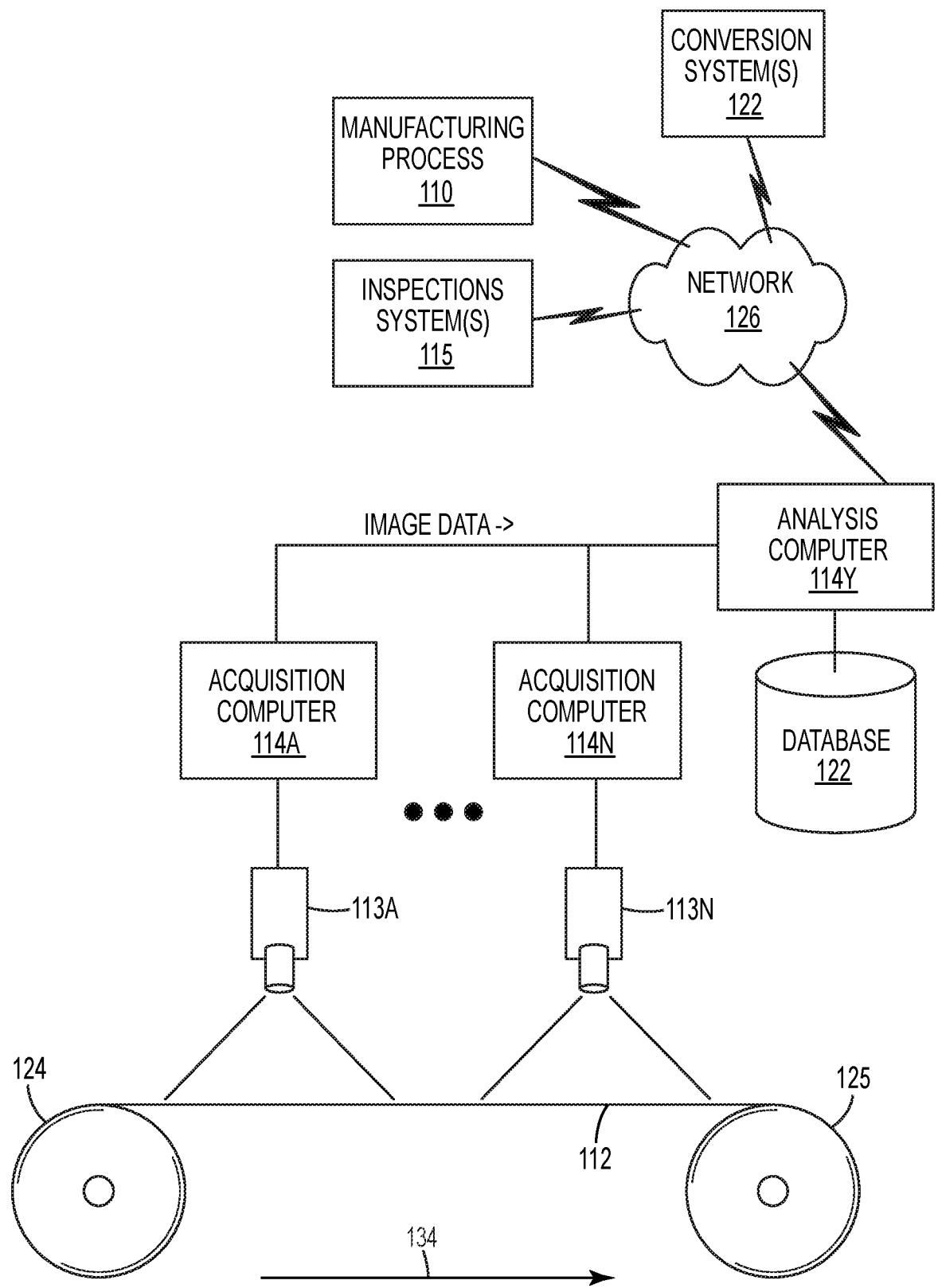
FIG. 2 is a functional block diagram illustrating additional details of the system of FIG. 1 in accordance with one or more exemplary implementations and techniques described in this disclosure.

FIG. 2 is a functional block diagram illustrating additional details of system 100 of FIG. 1 in accordance with one or more exemplary implementations and techniques described in this disclosure. As shown in FIG. 2, system 100 includes a plurality of image capturing devices 113A-113N, acquisition computers 114A-114N each coupled to a corresponding one of image capturing devices 113A-113N, or in some embodiments directly to analysis computer 114Y. Image capturing devices 113A-113N as shown in FIG. 2 may represent image capturing devices 113 as shown in FIG. 1, and may be arranged to perform any of the functions and to provide any of the features described with respect to image capturing devices 113 and FIG. 1. As shown in FIG. 2, acquisition computers 114A-114N and analysis computer 114Y may be components of image processing circuitry 114 as shown in FIG. 1, and may be arranged to perform any of the functions and to provide any of the features described with respect to image processing circuitry 114 and FIG. 1.

Referring back to FIG. 2, the inspection system 100 includes image capturing devices 113A-113N arranged to inspect web 112 as web 112 is continuously advanced past the image capturing devices. In the exemplary embodiment of inspection system 100 as shown in FIG. 2, a segment of web 112 is positioned between two support rolls 124 and 125. Image capturing devices 113A-113N are positioned adjacent to a surface of web 112 so that each of image capturing devices 113A-113N may image different portions of web 112. The imaged portions of web 112 that may be imaged by one or more of image capturing devices 113A-113N may overlap or crossover with one another, for example, relative to a cross-web dimension of the web. The number of image capturing devices that may be included in image capturing device 113A-113N is not limited to a particular number of devices, and may be two or more devices. Further, the physical arrangement and alignment of image capturing devices 113A-113N as shown in FIG. 2 is not intended to represent an actual arrangement and/or alignment of the image capturing devices relative to one another or to web 112 that might be used in an imaging station of system 100, and is intended merely to represent the concept of a plurality of image capturing devices that may be used in a system such as system 100. Embodiments of the arrangement and/or alignments of a plurality of image capturing devices that may be used to capture image data for use in generating a virtual camera array are further illustrated and described below for example with respect to FIGS. 3-6.

Referring again to FIG. 2, during the imaging process that may be performed using system 100, web 112 may be advanced in a direction generally indicated by arrow 134, which corresponds to a longitudinal (down-web) dimension of the web. In some embodiments, rolls 124 and 125 support and advance web 112 directly as the web is being provided by a manufacturing process, such as manufacturing process 110 (FIG. 1). In other embodiments, the imaging of web 112 as illustrated in FIG. 2 is performed at some point it time after the web has been manufactured and stored, for example, in the form of a roll of web material. In some embodiments, web 112 may be in the form of individual sheets of web having both a pre-defined width and length dimension, and that are advanced through the imaging station that includes image capturing devices 113A-113N so the that image capturing devices 113A-113N can image each of the sheets of web.

As shown in FIG. 2, image capturing device 113A-113N are positioned in proximity to the continuously moving web 112. Web 112 may be conveyed in a down-web direction generally indicated by arrow 134, and for example by mechanical forces applied to rolls 124 and/or 125. The mechanical forces applied to rotate rolls 124 and/or 125, and thus advance web 112, may be generated using, for example, electrical motors, or other means (none shown in FIG. 2) that are arranged to rotate rolls 124 and/or 125. As web 112 is advanced in the down-web direction, image capturing devices 113A-113N are arranged to image portions of the continuously moving web 112 to obtain image data.

Image capturing devices 113A-113N are not limited to any particular type of image capturing devices, and may be conventional imaging devices that are capable of imaging sequential portions of web 112 as the web is advanced past the image capturing devices, and provide outputs in the form of electronic signal, such as a digital data stream of image data. In some embodiments, at least one of image capturing devices 113A-113N is a line-scan camera. In other embodiments, at least one of image capturing devices 113A-113N is an area scan camera. In some embodiments, each of image capturing devices 113A-113N are a same type of image capturing device. In other embodiments image capturing devices 113A-113N includes at least one image capturing device that is a different type of image capturing device compared to the additional image capturing devices present in system 100.

As shown in FIG. 2, image capturing devices 113A-113N may include a plurality of cameras that provide electrical output signals representative of sensed images of web 112 to a respective set of acquisition computers 114A-114N. Acquisition computers 114A-114N are coupled to analysis computer 114Y, and are arranged to provide an output representative of image data captured by the corresponding image capturing devices 113A-113N to analysis computer 114Y. In other embodiments, image capturing devices 113A-113N may provide a digital data stream and/or an analog signal representative of the images captured by the cameras directly to a computing device, such as analysis computer 114Y, for further processing by processing circuitry included in analysis computer 114Y. Other sensors, such as laser scanners, may be utilized as image capturing devices 113A-113N. A "sequential portion" of web 112 refers to data associated with imaging the web that is acquired by a succession of single line images. Single lines may comprise an area of the continuously moving web 112 that maps to a single row of sensor elements or pixels within a given one of image capturing devices 113A-113N. Examples of devices suitable for acquiring the image data include line-scan cameras such as those available under the trade name "PIRANHA" from Dalsa, Waterloo, Ontario, Canada; or "MODEL AVIIVA SC2 CL" from Atmel, San Jose, Calif. Additional examples include laser scanners from Surface Inspection Systems GmbH, Munich, Germany, in conjunction with an analog to digital converter.

Referring again to FIG. 2, processing circuitry of analysis computer 114Y processes image streams including image data provided from acquisition computers 114A-114N, or in the alternative directly from image capturing devices 113A-113N, to generate a virtual camera array as an output. As part of generating the virtual camera array, analysis computer 114Y spatially synchronizes the image data in the virtual camera array to the specific and corresponding physical locations along the web were the respective image data was captured, while aligning the image data provided by each of the image capturing devices 113A-113N to one another.

Processing circuitry of analysis computer 114Y may determine the spatial position along web 112 of each imaged area for the image data included in the virtual camera array, at least with respect to the down-web dimension of the web. The image data provided by image capturing devices 113A-113N may include data that indicates the cross-web positioning of the image data relative to each imaged area of web 112 for a particular one of image capturing devices 113A-113N. In addition, analysis computer 114Y may have information related to the relative positioning and the imaging area alignments for each of image capturing devices 113A-113N. Based on the image data and information related to the relative positioning and alignment of image capturing devices 113A-113N, analysis computer 114Y generates the virtual camera array including proper alignment of the image data provided by each of image capturing devices 113A-113N and spatially synchronized to the specific physical positions along both the down-web and the cross-web locations of the web where the image data was captured.

Thus, each of the imaged areas of the web for which image data has been captured is spatially synchronized to the physical position of the corresponding imaged area along the cross-web and the down-web dimensions of the web as a part of the image data included in the virtual camera array. For example, a coordinate system may be defined such that the x-dimension coordinate for an imaged area of the web represents a distance across the web in the cross-web dimension, and a y-dimension coordinate for the imaged area of the web represents a distance along a length of web 112, (e.g., along the down-web dimension of the web). These x and y coordinates may be used to generate a mapping of the image data that to the corresponding physical location along web 112 where the image data was captured.

Generation of the virtual camera array may include removal, by analysis computer 114Y, of redundant (duplicate) image data generated by the overlapping or crossover of two or more imaging areas being imaged by imaging devices 113A-113N. Generation of the virtual camera array may also include analysis computer 114Y performing one or more pre-processing operations of the image data included within the virtual camera array, as further described below. Once the virtual camera array has been generated, including the removal of any redundant data, and any preprocessing has been completed, analysis computer 114Y is arranged to output the image data as the virtual camera array to inspection system 115, for example, through a network 126. Analysis computer 114Y may also be arranged to output the image data in the form of the virtual camera array to a database, such as database 122. Database 122 as shown in FIG. 2 may be arranged to provide any of the features and perform any of the functions ascribed to database 122 as illustrated and described with respect to FIG. 1.

Referring again to FIG. 2, inspection system 115 receives the data included in the virtual camera array, and may perform any of the analysis function, and may be arranged to provide any of the features ascribed to inspection system 115 as illustrated and described with respect to FIG. 1. For example, inspection system 115 may analyze the data included in the virtual camera to determine if any defects, such as machine line defects, anomalies, or other types of surface and/or dimensional defects exist in the web. Inspection system 115 may apply one or more threshold values to the image data included in the virtual camera array to determine at least one status, or a plurality of statuses, associate with the functional and/or physical characteristic of the web based on an analysis of the image data included in the virtual camera array. Inspection system 115 may also analyze any image data related to pattern(s) printed on the surfaced of the imaged web, or otherwise incorporated within the web.

A computer monitor (e.g., computer monitor 119A or 120A, FIG. 1) may be coupled to inspection system 115 and may be used to provide graphical displays that are indicative of the results of the analysis of the image data included in the virtual camera array. For example, inspection system may generate a graphical image of portions of web 112 that includes graphical indications of the location of any defects determined to exist in the web through the analysis of the image data included in the virtual camera array. The graphical images may also include indications of a status that may have been assigned to various portion of web 112 based on the analysis of the image data included in the virtual camera array. The graphical images may include a graphical representation of one or more patterns imaged from web 112.

As shown in FIG. 2, inspection system 115 may be coupled to network 167 that may also be coupled to one or more additional systems, such as manufacturing process 110 and/or conversion control system 123. Network 167 is not limited to any particular type of network, and may be any network, including the internet, a Local Area Network (LAN), a Wide Area Network (WAN) using any type of communication protocol that allows the devices coupled to network 126 to communicate with one another. Communications occurring between inspection system 115 and manufacturing process 110 may include real time communications, or communications delayed in time, and that correspond to the analysis of the image data included in the virtual camera array. Feedback provided by inspection system 115 to manufacturing process 110 may include any of the types of communications, and may be arranged to perform any of the functions and to provide any of the features described above with respect to feedback to manufacturing process 110 and FIG. 1. As shown in FIG. 2, inspection system 115 may also be coupled to conversion system 123 through network 126. Communications occurring between inspection system 115 and conversion system 123 may include real time communications, or communications delayed in time, and that correspond to the analysis of the image data included in the virtual camera array. Information provided by inspection system 115 to conversion system 123 may include any of the types of communications, and may be arranged to perform any of the functions and to provide any of the features described above with respect to feedback to manufacturing process 110 and FIG. 1, including the automatic control of the conversion of part by conversion system 123 from web 112.

Figure 3:
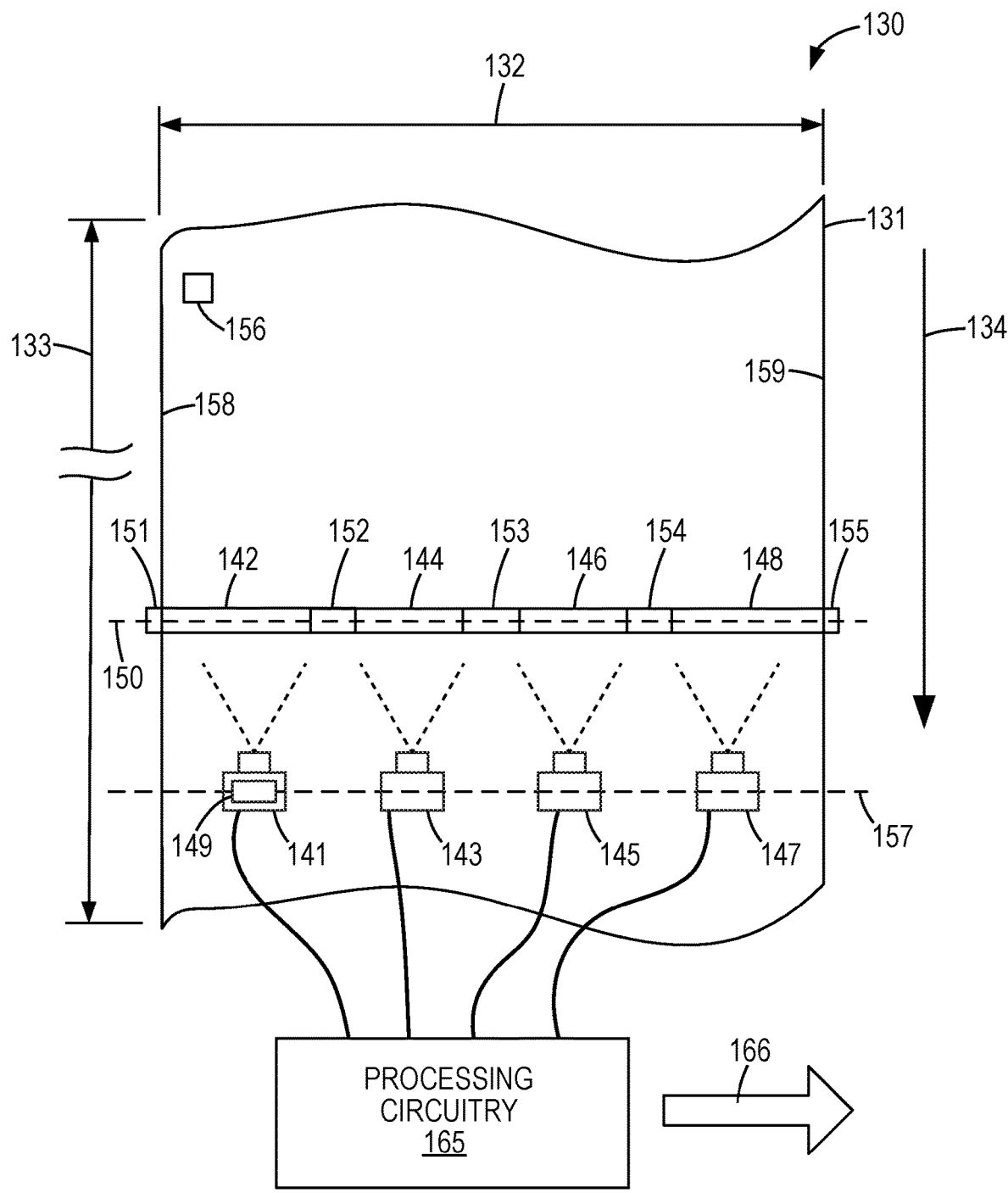
FIG. 3 is a conceptual diagram illustrative of an arrangement of image capturing devices and associated imaging areas for inspection of a web in accordance with one or more exemplary implementations and techniques described in this disclosure.

FIG. 3 is a conceptual diagram 130 illustrative of an arrangement of image capturing devices and associated imaging areas for inspection of a web in accordance with one or more exemplary implementations and techniques described in this disclosure. Diagram 130 includes a plurality of image capturing devices 141, 143, 145, and 147 arranged along a cross-web dimension 132 of web 131. Image capturing devices 141, 143, 145, and 147 are not limited to any particular type or types of image capturing devices, and may be a plurality of conventional type imaging devices that are capable of imaging sequential portions of web 131 as the web is advanced past the image capturing devices, and arranged to provide outputs in the form of electronic signal, such as a digital data stream of image data corresponding to the images captured by the imaging of the web. Image capturing devices 141, 143, 145, and 147 as illustrated and described with respect to FIG. 3 may represent image capturing devices 113 located at an imaging station as illustrated and described with respect to system 100 and FIG. 1, or image capturing devices 113A-113N as illustrated and described with respect to FIG. 2, and may be arranged to perform any of the functions and provide any of the features described with respect to image capturing devices 113 and/or 113A-113N, and any equivalents thereof.

As shown in FIG. 3, each of image capturing devices 141, 143, 145, and 147 may include a light sensor array, illustratively shown with respect to image capturing device 141 as light sensor array 149. Each of the light sensor arrays may be arranged to capture light received at the light sensor array, and to generate electrical signals corresponding to various parameters, such as light intensity, color, and other parameters related to the wavelengths of light that were included in the captured light received at the light sensor array. Each of image capturing devices 141, 143, 145, and 147 is communicatively coupled to processing circuitry 165, either by a wired connection such as an electrical cable, or via a wireless connection. In some embodiments, one or more of image capturing devices 141, 143, 145, and/or 147 is a line-scan camera. In other embodiments, one or more of image capturing devices 141, 143, 145, and/or 147 is an area scan camera. As shown in FIG. 3, image capturing devices 141, 143, 145, and 147 may be a set of cameras that provide electrical output signals to the processing circuitry 165 representative of sensed images of web 131. Processing circuitry 165 may be image processing circuitry 114 as illustrated and described with respect to FIGS. 1 and 2, and may be configured to perform any of the functions and to perform any of the features ascribed to the image processing circuitry of FIGS. 1 and 2.

In FIG. 3, web 131 is not limited to any particular type of web or web product, and may include any type of web, including single and/or multi-layer webs. Web 131 is provided as web of material that is advanced through a processing line in a down-web direction that is generally indicated by arrow 134. Web 131 has a width dimension that is fixed, as indicated by cross-web dimension 132, and a length dimension, generally indicated by length dimension 133, that may be a predetermined length, or that may be an indeterminant length. Width dimension 132 may have a value in a range from 12-36 inches, or a width that is greater than or less than this range of values. Length dimension 133 for web 131 may be many times greater than the width dimension, and may consist of hundreds of yards of web 131 that can be provided, for example, in a roll of the web material.

A single-thickness layer of web 131 may be advanced in a down-web direction, generally indicated by arrow 134, so that a portion of the web forming web 131 is moved into and out of the imaging areas of image capturing devices 141, 143, 145, and 147. As shown in FIG. 3, image capturing device 141 is arranged to image imaging area 142 of web 131. Imaging area 142 includes area 151 that extends past left-hand edge 158 of web 131, and overlap area 152. Image capturing device 143 is positioned adjacent and next to image capturing device 141 along camera axis 157 having an orientation corresponding to the orientation of the cross-web dimension of web 131. Image capturing device 143 is arranged to image imaging area 144 of web 131. Imaging area 144 includes overlap area 152 that overlaps with imaging area 142, and includes overlap area 153 that overlaps imaging area 146. Image capturing device 145 is positioned adjacent and next to image capturing device 143 along camera axis 157 and opposite the side of image capturing device 143 where image capturing device 141 is positioned. Image capturing device 145 is arranged to image imaging area 146 of web 131. Imaging area 146 includes overlap area 153 that overlaps with imaging area 144, and includes overlap area 154 that overlaps imaging area 148. Image capturing device 147 is positioned adjacent and next to image capturing device 145 along camera axis 157 and opposite the side of image capturing device 145 where image capturing device 143 is positioned. Image capturing device 147 is arranged to image imaging area 148 of web 131. Imaging area 148 includes overlap area 154 that overlaps with imaging area 146. Imaging area 148 further includes area 155 that extends past right-hand edge 159 of web 131.

The arrangement of image capturing devices 141, 143, 145 and 147, including alignment of these devices along camera axis 157, creates an alignment of the respective imaging areas 142, 144, 146, and 148 along a corresponding imaging axis 150. Imaging axis 150 also has an orientation that corresponds to a same orientation as a cross-web dimension of web 131. The extension of imaging area 142 beyond left-hand edge 158, the extension of imaging area 148 beyond right-hand edge 159, and the overlapping of the imaging areas represented by overlap areas 152, 153, and 154 aligned along imaging axis 150 creates a "strip" of imaging areas that, when combined together, provide an imaging area that extends across web 131 in cross-web dimension of web 131 in its entirety at some position relative to down-web dimension 133 of the web. The "strip" including imaging areas 142, 144, 146, and 148 may be referred to as virtual imaging area, and includes a portion of web 131 that may be imaged by image capturing device 141, 143, 145, and 147 that extends across the entirety of web 131 in a cross-web dimension.

The positioning of image capturing devices 141, 143, 145, and 147 may be fixed so that the "strip" imaged by the image capturing devices is also imaged at some predetermined position along the down-web dimension of web 131 relative to the positioning of the image capturing devices. Although the orientation of camera axis 157 and imaging axis 150, as shown in FIG. 2, both have an orientation that is a same orientation as the cross-web dimension 132 of web 131, a different orientation of camera axis 157 that still includes all of image capturing devices 141, 143, 145, and 147 aligned along the axis, but having an orientation that, for example, is not the same orientation as the cross-web dimension 132, is contemplated by the embodiment shown in FIG. 2. For example, the alignment of image capturing devices 141, 143, 145, and 147 may including positioning the image capturing devices along camera axis 157 that forms some non-parallel angle relative to the cross-web dimension 132 of web 131. In such embodiments, imaging axis 150 may also include an orientation corresponding to orientation of camera axis 157, and that has a same non-parallel angle of orientation relative to the cross-web dimension 132 of the web as formed by camera axis 157.

By advancing web 131 in the down-web dimension as indicated by arrow 134, additional portions of web 131 may be advanced toward, placed into, and advanced out of the imaging areas illustratively depicted as imaging areas 142, 144, 146, and 148 in FIG. 3. Depending on the imaging rate of image capturing devices 141, 143, 145, and 147, and the speed at which web 131 is being advanced, the cross-web dimensional "strips" of the imaged portions of web 131 may be generated at various intervals along down-web dimension 133 of the web. In some embodiments, these virtual imaging areas may be generated as contiguous strips that cover the entirety of web 131 along down-web dimension 133 as well as across the cross-web dimension 132 of the web, thus providing imaging of large portions (e.g., 100%) of the web 131 that is eventually passed through the imaging areas of the image capturing devices. The image data captured for a "strip" including imaging areas 142, 144, 146 and 148 may be associated with a particular down-web position of web 131. For example, the position of the "strip" associated with the image data captured for each of imaging areas 142, 144, 146, and 148 may be associated with a unique down-web position along the web. The down-web position may be determined based on information sensed or determined by positional information provided by the imaging apparatus that determines the down-web position of the imaged data associated with the particular portion of the web imaged for each of the virtual imaging areas. In some embodiments, one of image capturing devices 141, 143, 145, or 147 may be configured to image and read positional information from a fiducial mark such as fiducial mark 156, and to generate and to provide position data to processing circuitry 165 in addition to the image data generated by the image capturing device as a result of imaging web 131.

As web 131 is advanced in the direction indicated by arrow 134, a series of images may be taken for the portions of web 131 as these portions of web are advanced into imaging areas 142, 144, 146, 148, creating a series of the virtual imaging areas in sequence along the down-web direction of web 131. The image data from each of image capturing devices 141, 143, 145, and 147 for each of the virtual imaging areas is communicated to processing circuitry 165. The image data from each of these virtual imaging areas may be spatially synchronized with the associated positional information, for example, position data generated by one or more of the image capturing devices, and used to form the virtual camera array that includes image data captured for each of imaging areas 142, 144, 146, and 148 and extending along the web in the down-web dimension.

The image data may include any redundant data associated with two of the image capturing devices capturing image data associated with a same portion of the web in overlap areas 152, 153, and 154. Processing of the image data by processing circuitry 165 that is included in the virtual camera array may include removal of any duplication of the redundant data associated with these overlap areas from the virtual camera array. In addition, data associated with any image data captured for areas 151 and 155 pertaining to areas extending beyond left-hand edge 158 and right-hand edge 159, respectively, of web 131 may also be removed from the image data included in the virtual camera array. The virtual camera array may be further processed using one or more pre-processing procedures, as described throughout this disclosure, before outputting the virtual camera array for analysis by at least one inspection system.

Processing circuitry 165 is not limited to any particular type of processing circuitry, and may include any type of processing circuitry, including one or more processors or microprocessors and associated memory circuitry, arranged to receive the image data and the positional data generated by the image capturing devices and any positional sensors (when utilized to provide position data), respectively, and to process the image data and positional data to generate the virtual camera array associated with the imaging of web 131. The processing circuitry may include some number of processors or microprocessors, in some embodiments a single processor or microprocessor, that is less than the total number of image capturing devices being utilized to generate the image data associated with the imaging of web 131. As such, a more efficient, more flexible, and less expensive system may be provided for generating and analyzing image data used to inspect web 131, compared for example to a system in which each image capturing device is associated with a separate processor (or separate microprocessor) used to process the image data provide by that particular image capturing device.

Once processing circuitry 165 has generated the virtual camera array, including removal of any redundant data and any data related to imaged areas that lie outside the edges of the web, along with any pre-processing that processing circuitry 165 is arranged to perform on the virtual camera array, the data associated with the virtual camera array is provided as an output from the processing circuitry 165, as illustratively represented by arrow 166. The output of the virtual camera array may be received by at least one inspection system, such inspection system 115 and illustrated in FIGS. 1 and 2 or inspection system 220 as illustrated and described below with respect to FIG. 7, for analysis of the data including in the virtual camera array with respect to a variety of inspections and the determination of status(es) that may be deemed important and/or required with respect to the inspection of web 131. In other embodiments, processing circuitry 165 may also be configured to perform the analysis of the data included in the virtual camera array to determine any inspection results and/or to determine one or more statuses that may be derived by analysis of the data included within the virtual camera array.

Figure 4:
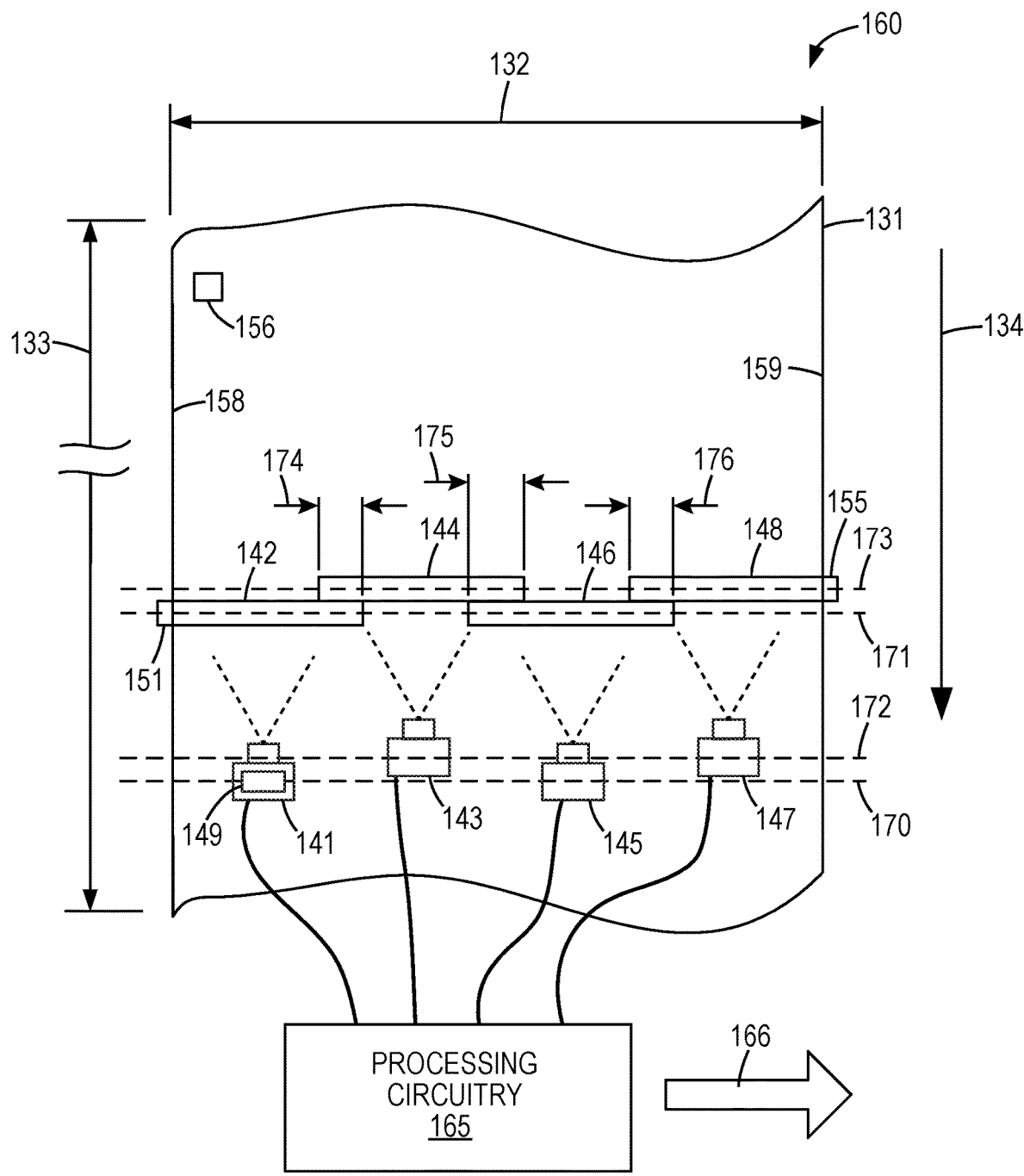
FIG. 4 is a conceptual diagram illustrative of another arrangement of image capturing devices and associated imaging areas for inspection of a web in accordance with one or more exemplary implementations and techniques described in this disclosure.

FIG. 4 is a conceptual diagram 160 illustrative of another arrangement of image capturing devices and associated imaging areas for inspection of a web in accordance with one or more exemplary implementations and techniques described in this disclosure. In a manner similar that illustrated and described with respect to diagram 130 and FIG. 3, diagram 160 as shown in FIG. 4 includes a plurality of image capturing devices 141, 143, 145, and 147 arranged along a cross-web dimension 132 of web 131. In contrast to diagram 130 of FIG. 3, image capturing devices 141, 143, 145, and 147 as shown in diagram 160 of FIG. 4 are arranged so that the imaging areas of the image capturing devices are arranged in a staggered pattern relative to down-web dimension 133 of web 131, as further described below. Image capturing devices 141, 143, 145, and 147 as illustrated and described with respect to FIG. 4 may represent image capturing devices 113 and/or 113A-113N located at an imaging station as illustrated and described with respect to system 100 and FIGS. 1 and 2, and may be arranged to perform any of the functions and provide any of the features described with respect to image capturing devices 113 and/or 113A-113N, and any equivalents thereof.

Other than the physical arrangement of image capturing devices 141, 143, 145, and 147 as illustrated and described with respect to FIG. 3, the image capturing devices shown in diagram 160 as shown in FIG. 4 may be any of the types of image capturing devices described above with respect to diagram 130 and FIG. 3, including conventional type image capturing devices, line scan cameras, and/or area scan cameras. Each of image capturing devices 141, 143, 145, and 147 as shown in diagram 160 is arranged to provide electrical output signals to processing circuitry 165 that corresponds to image data captured by imaging web 131. Positional data associated with at least the down-web position of image data captured by imaging web 131 using the image capturing devices arranged as shown in diagram 160 may be provided by image data captured by one or more of image capturing devices 141, 143, 145, and 147. In diagram 160, web 131 is not limited to any particular type of web or web material, and may include any type of web, including single and/or multi-layer webs.

In diagram 160, web 131 is provided as web of material that is advanced through a processing line in a down-web direction that is generally indicated by arrow 134. Web 131 has a width dimension that is fixed, as indicated by cross-web dimension 132, and a length dimension, generally indicated by length dimension 133, that may be a predetermined length, or that may be an indeterminant length. Width dimension 132 may have a value in a range from 12-36 inches, or a width that is greater than or less than this range of values. Length dimension 133 for web 131 may be many times greater than the width dimension, and may consist of hundreds of yards of web 131 that can be provided, for example, in a roll of the web in the form of a web. A layer of web 131 may be advanced in a down-web direction, generally indicated by arrow 134, so that a portion of the web forming web 131 is moved into and out of the imaging areas of image capturing devices 141, 143, 145, and 147.

As shown in FIG. 4, image capturing device 141 is arranged to image imaging area 142 of web 131. Image capturing device 141 is positioned along first camera axis 170 having a same orientation as the cross-web dimension 132 of web 131, wherein the orientation of first camera axis 170 is perpendicular to down-web dimension 133 of the web. Imaging area 142, which image capturing device 141 is arranged to image, extends along a first imaging axis 171 having a same orientation as the cross-web dimension 132 of the web, wherein the first imaging axis 171 has an orientation that is perpendicular to down-web dimension 133 of the web. Imaging area 142 also includes area 151 that extends past left-hand edge 158 of web 131. Imaging area 142 does not overlap directly with any other of imaging areas 144, 146, or 148 of image capturing devices 143, 145, or 147, respectively.

Image capturing device 143 is arranged to image imaging area 144 of web 131. Image capturing device 143 is positioned next to image capturing device 141, but offset relative to the position of image capturing device 141 relative to down-web dimension 133 of web 131. Image capturing device 143 is positioned along second camera axis 172 having a same orientation as the cross-web dimension 132 of web 131, wherein the orientation of second camera axis 172 is generally perpendicular to down-web dimension 133 of the web, and offset from first camera axis 170 by a non-zero value distance along down-web dimension 133 of the web. Imaging area 144, which image capturing device 143 is arranged to image, extends along second imaging axis 173 having a same orientation as the cross-web dimension 132 the web, wherein second imaging axis 173 has an orientation that is perpendicular to down-web dimension 133 of the web, and offset from the first imaging axis 171 by some non-zero value distance along down-web dimension 133 of the web. Imaging area 144 does not overlap directly with any other of imaging areas 142, 146, or 148 of image capturing devices 141, 145, or 147, respectively. The boundary of imaging area 144 that is closest to left-hand edge 158 of web 131 extends along second imaging axis 173 to some non-zero value distance that is closer to left-hand edge 158 than a boundary for imaging area 142 that is farthest away from left-hand edge 158, so that imaging area 142 and imaging area 144 extend past one another in the cross-web direction, as indicated by crossover area 174. Because of the offset between the first imaging axis 171 along which imaging area 142 lies and second imaging axis 173 along which imaging area 144 lies, imaging areas 142 and 144 do not directly overlap onto any of the same areas relative to web 131, but share a common border with each other in crossover area 174.

Image capturing device 145 is arranged to image imaging area 146 of web 131. Image capturing device 145 is positioned next to image capturing device 143, and on the side of image capturing device 143 opposite image capturing device 141, but offset relative to the position of image capturing device 143 and aligned with image capturing device 141 relative to the down-web dimension of web 131. Image capturing device 145 is positioned along first camera axis 170, and thus aligns with image capturing device 141 relative to the cross-web dimension of web 131. Imaging area 146, which image capturing device 145 is arranged to image, extends along first imaging axis 171, and aligns with imaging area 142, but does not extend along first imaging axis 171 to overlap with imaging area 142. Imaging area 146 does not overlap directly with any other of imaging areas 142, 146, or 148 of image capturing devices 141, 145, or 147, respectively. The boundary of imaging area 144 that is closest to left-hand edge 158 of web 131 extends along first imaging axis 171 to a non-zero value distance that is closer to left-hand edge 158 than a boundary for imaging area 144 that is farthest away from left-hand edge 158, so that imaging area 146 and imaging area 144 extend past one another in the cross-web direction, as indicated by crossover area 175. Because of the offset between first imaging axis 171 along which imaging area 146 lies and second imaging axis 173 along which imaging area 144 lies, imaging areas 146 and 144 do not directly overlap onto any of the same areas relative to web 131, but share a common border with each other in crossover area 175.

Image capturing device 147 is arranged to image imaging area 148 of web 131. Image capturing device 147 is positioned next to image capturing device 145, and on the side of image capturing device 145 opposite image capturing device 143, but offset relative to the position of image capturing device 145 and aligned with image capturing device 143 relative to down-web dimension 133 of web 131. Image capturing device 147 is positioned along second camera axis 172, and thus aligns with image capturing device 143 relative to down-web dimension 133 of web 131. Imaging area 148, which image capturing device 147 is arranged to image, extends along second imaging axis 173, and aligns with imaging area 144, but does not extend along second imaging axis 173 to overlap with imaging area 144. Imaging area 148 does not overlap directly with any other of imaging areas 142, 144, or 146 of image capturing devices 141, 143, or 145, respectively.

Imaging area 148 also includes area 155 that extends past right-hand edge 159 of web 131. The boundary of imaging area 148 that is farthest from right-hand edge 159 of web 131 extends along second imaging axis 173 to some non-zero value distance that is farther from right-hand edge 159 than a boundary for imaging area 146 that is closest to right-hand edge 159, so that imaging area 146 and imaging area 148 extend past one another in the cross-web direction, as indicated by crossover area 176. Because of the offset between first imaging axis 171 along which imaging area 146 lies and second imaging axis 173 along which imaging area 148 lies, imaging areas 146 and 148 do not directly overlap onto any of the same areas relative to web 131, but share a common border with each other in crossover area 176.

As shown in FIG. 4, the combination of imaging areas 142, 144, 146, and 148 provide complete coverage of areas of web 131 that may be imaged in a cross-web dimension 132 of the web. Area 151 of imaging area 142 that extends beyond left-hand edge 158 of web 131 and area 155 of imaging area 148 that extends beyond the right-hand edge of the web, in combination with crossover areas 174, 175, and 176, provide imaging areas that extend across the entirety of web 131 in the cross-web dimension. In addition, when image capturing devices 141, 143, 145, and 147 are configured to image the web on a continuous basis as the web is advanced, for example, in the direction indicated by arrow 134, web 131 may be imaged in its entirety along down-web dimension 133 of the web. As image capturing devices 141, 143, 145, and 147 provide image data consistent with the staggered imaging pattern illustrated in FIG. 4, the image data provided by the image capturing devices may be spatially synchronized by processing circuitry 165, for example, using position data generated by one or more of image capturing devices 141, 143, 145, and 147, to electronically align and spatially synchronize the image data so that the staggered imaging areas are properly aligned along each of first imaging axis 171 and second imaging axis 173 despite the image data for different cross-web portions of web 131 being captured by different image capturing devices at different times.

The spatially synchronization of the image data provided by each of the image capturing devices 141, 143, 145, and 147 may be performed by processing circuitry 165 to provide a virtual camera array as an output (arrow 166) from the processing circuitry. The processing of the image data provided by the image capturing devices as arranged in diagram 160 may include any of the data processing, such a removal of redundant data (e.g., duplicate image data generated related to crossover areas 174, 175, 176), removal of data related to imaged areas that lie beyond edges 158, 159 of the web, and any pre-processing of the image data included in the virtual camera array, as described throughout this disclosure, and any equivalent thereof.

For example, image data captured by image capturing devices 141 and 143 from imaging areas 142 and 146, respectively, may be combined with image data captured by image capturing devices 143 and 147 from imaging areas 144 and 148 respectively, but combining image data captured from the portions of the web existing along first imaging axis 171 with image data from imaging areas 144 and 146 taken at a different time and along the same down-web portion of the web in order to complete the imaging of the web along first imaging axis 171 across the entirety of the cross-web dimension 132 of the web. Using the staggered pattern of alignment of the image capturing devices, and the resulting staggered pattern of the corresponding imaging areas, a larger size image capturing device, or a larger number of image capturing devices in total, may be placed in position over a web, such as web 131 that is to be inspected using the captured image data, than might be possible if the image capturing devices were required to be physically arranged along a common axis, such as camera axis 157 as shown in FIG. 3. The staggered arrangements of image capturing device as shown in FIG. 4 is a non-limiting embodiment of a possible physical arrangement of image capturing devices positioned to capture image data for use in the inspect of a web. Other armaments of image capturing devices used for web inspection are possible, and are contemplated for use in providing image data that may be used to form a virtual camera array as described throughout this disclosure, and any equivalents thereof.

For some embodiments, the alignment of the image capturing devices used for imaging a web such as web 131 may be turned at non-perpendicular angles relative to the cross-web and/or down-web dimension of the web, such that the orientation of the imaging areas for one or more of the image capturing devices extends along both first imaging axis 171 and second imaging axis 173, both axes having an orientation that is not parallel to the cross-web dimension of the web and that is not perpendicular to the down-web dimension of the web. The resultant imaging areas may form a staggered pattern of imaging areas, such as a cross-stitch or herringbone pattern across the surface of the web, wherein each imaging area extends along an axis having an orientation that is not perpendicular to an axis having a cross-web orientation relative to the web, and wherein each imaging area extends past the boundaries of at least one other imaging area relative to the cross-web dimension of the web.

Regardless of the pattern of imaging areas formed by the positioning of the image capturing devices, as long as the combination of the imaging areas being imaged by the image capturing devices extends across the cross-web dimension of the web in the entirety without having any areas of the web that are not included in at least one of the imaging areas relative to the cross-web dimension of the web, the processing circuitry, such as processing circuitry 165 may be arranged to spatially synchronize the image data captured by each of the image capturing devices so that the image data can be spatially aligned in relation to both the cross-web and the down-web dimensions of the web. Any redundant data generated by multiple ones of the image capturing devices imaging a same portion of the web, such as the overlap and/or crossover areas as described above, may also be removed by the processing circuitry to generate the virtual camera array associated with the imaged data. Thus, the system illustrated and described in diagram 160 of FIG. 4 allows for a large degree in flexibility with respect to the number and/or the physical arrangement of image capturing devices that may be included in a web inspection system, while still allowing inspection of large portions (e.g., 100%) of the web, which may be performed at a rapid rate while the web is being continuously advanced past the imaging areas of the image capturing devices.

In a similar manner as described above with respect to diagram 130 and FIG. 3, once processing circuitry 165 has generated the virtual camera array based on the image data provided by the image capturing devices arranged as shown in diagram 160 and FIG. 4, including removal of any redundant data and data related to imaged areas that lie outside the edges of the web, along with any pre-processing that processing circuitry 165 is arranged to perform on the virtual camera array, the data associated with the virtual camera array is provided as an output from processing circuitry 165, as illustratively represented by arrow 166. The output of the virtual camera array may be received by one or more inspection system, such as inspection system 115 (FIGS. 1 and 2) or inspection system 220 (FIG. 7), for analysis of the data including in the virtual camera array with respect to a variety of inspections and status related determinations that may be deemed important and/or required with respect to web 131. In other embodiments, processing circuitry 165 may also be configured to perform the analysis of the data included in the virtual camera array to determine any inspection results and/or to determine one or more statuses for web 131 that may be derived by analysis of the data included within the virtual camera array.

Figure 5:
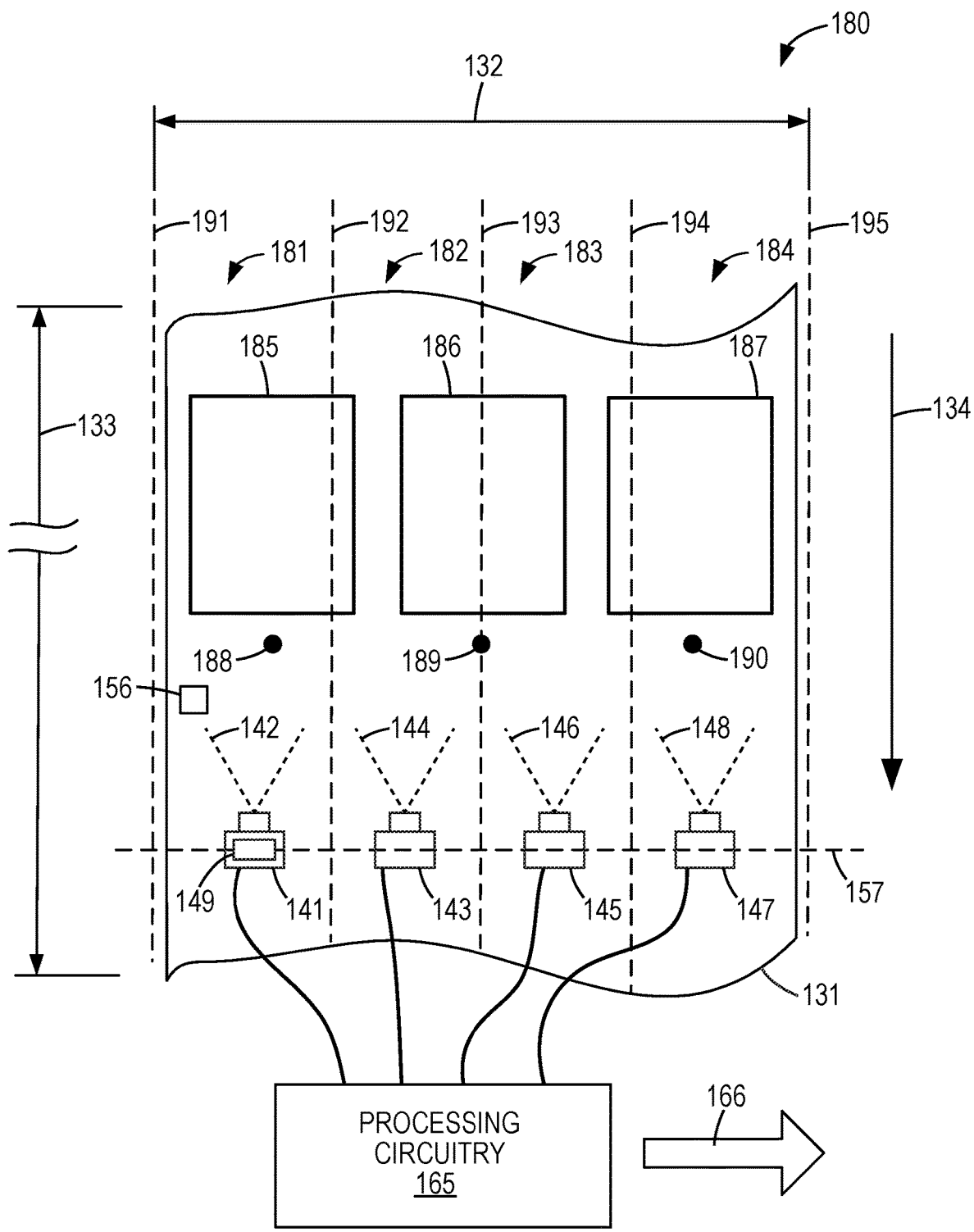
FIG. 5 is a conceptual diagram illustrative of an arrangement of image capturing devices for imaging a web that includes a pattern in accordance with one or more exemplary implementations and techniques described in this disclosure.

FIG. 5 is a conceptual diagram 180 illustrative of an arrangement of image capturing devices for imaging a web that includes a pattern in accordance with one or more exemplary implementations and techniques described in this disclosure. Diagram 180 includes a plurality of image capturing devices 141, 143, 145, and 147 arranged along a cross-web dimension 132 of web 131. In a manner similar that illustrated and described with respect to diagram 130 and FIG. 3, diagram 180 as shown in FIG. 5 includes a plurality of image capturing devices 141, 143, 145, and 147 arranged along a same position relative to down-web dimension 133 of web 131. The physical arrangement of image capturing devices 141, 143, 145, and 147 as shown in diagram 180, however, is not limited this particular physical arrangement, and may include, in some embodiments, a staggered physical arrangement of the image capturing devices as illustrated and described with respect to diagram 160 and FIG. 4. Image capturing devices 141, 143, 145, and 147 as illustrated and described with respect to FIG. 5 may represent image capturing devices 113 and/or 113A-113N located at an imaging station as illustrated and described with respect to system 100 and FIGS. 1 and 2, and may be arranged to perform any of the functions and provide any of the features described with respect to image capturing devices 113, 113A-113N and any equivalents thereof.

Web 131 as shown in diagram 180 of FIG. 5 is not limited to any particular type of web, and may include any type of web, including single and/or multi-layer webs, as described throughout this disclosure, and any equivalents thereof. The embodiment of web 131 as shown in FIG. 5 includes a pattern comprising a plurality of shapes 185, 186, and 187 illustratively represented by the outlines of the shapes, that may be printed onto a surface of web 131, or otherwise incorporated into the web. Each of shapes 185, 186, and 187 is illustrated in diagram 180 as an enclosed rectangular shape, the shapes aligned with each other across a top side and a bottom side (short sides) of the rectangles relative to down-web dimension 133 of web 131. A pattern provided on or incorporated within web 131, however, is not limited to any particular shape, or to a pattern that may or may not include an enclosed shape, and may include any type of a pattern and/or any variations of a pattern that could be printed onto or incorporated within a web such as web 131.

As shown in diagram 180, web 131 is provided as web of material that is advanced through an imaging apparatus in a down-web direction that is generally indicated by arrow 134. Web 131 has a width dimension that is fixed, as indicated by cross-web dimension 132, and a length dimension, generally indicated by length dimension 133, that may be a predetermined length, or that may be an indeterminant length. Width dimension 132 may have a value in a range from 12-36 inches, or a width that is greater than or less than this range of values. Length dimension 133 for web 131 may be many times greater than the width dimension, and may consist of hundreds of yards of web 131 that can be provided, for example, in a roll of the web in the form of a web. Image capturing devices 141, 143, 145, and 147 may be arranged adjacent to one another, and physically positioned along camera axis 157 having an orientation that extends across web 131 in a cross-web orientation that is generally perpendicular to down-web dimension 133 of the web. As described above, the physical alignment of the image capturing devices is not limited to an in-line arrangement, and other arrangements, such as the staggered arrangement as illustrated and described with respect to FIG. 4, may also be utilized in the embodiments illustrated by diagram 180.

Referring back to FIG. 5, image capturing device 141 is positioned closest to left-hand edge 158 of web 131, and is arranged to image the areas of web 131 along imaging row 181 as web 131 is advanced. Imaging row 181 includes any portion of the web 131 between dashed line 191 and dashed line 192 and that passes through the imaging area of image capturing device 141. In embodiments where web 131 is continuously advanced in the down-web direction generally indicated by arrow 134, the imaging area of image capturing device 141 may include any portions of the web the lie between dashed lines 191 and 192 in a cross-web dimension, and extending along the entirety of length dimension 133 (down-web dimension) of the web within imaging row 181. As shown in diagram 180, dashed line 191 is positioned to the left of left-hand edge 158 of web 131, thus allowing the imaging area that can be captured by image capturing device 141 to include the entirety of web 131 that lies to the left of dashed line 192, including left-hand edge 158 of the web.

Image capturing device 143 is positioned next to and to the right of image capturing device 141 in diagram 180. Image capturing device 143 is arranged to image the areas of web 131 along imaging row 182. Imaging row 182 includes any portion of web 131 between dashed line 192 and dashed line 193 and that passes through the imaging area of image capturing device 143. In embodiments where web 131 is continuously advanced in the down-web direction generally indicated by arrow 134, the imaging area of image capturing device 143 may include any portions of the web that lie between dashed lines 192 and 193 in a cross-web dimension 132 and extending along the entirety of longitudinal dimension 133 (down-web dimension) of web 131 within imaging row 182. For clarity and simplicity, dashed line 192 is shown in diagram 180 as a single line. Dashed line 192 may instead have a width in the cross-web direction that represents an overlap in the imaging areas imaged by image capturing device 141 and image capturing device 143. This overlap area of web 131, when imaged by both image capturing devices 141 and 143, would generate redundant data that could be processed and removed from the image data when generating a virtual camera array using image data provided by image capturing devices 141 and 143 as arranged in diagram 180.

In diagram 180, image capturing device 145 is positioned next to and to the right of image capturing device 143 on a side of image capturing device 143 opposite image capturing device 141. Image capturing device 145 is arranged to image the areas of the web along imaging row 183. Imaging row 183 includes any portion of web 131 that lies between dashed line 193 and dashed line 194 and that passes through the imaging area of image capturing device 145. In embodiments where web 131 is continuously advanced in the down-web direction generally indicated by arrow 134, the imaging area of image capturing device 145 may include any portions of the web that lie between dashed lines 193 and 194 in a cross-web dimension 132 and extending along the entirety of longitudinal dimension 133 (down-web dimension) of web 131 within imaging row 183. For clarity and simplicity, dashed line 193 is shown in diagram 180 as a single line. Dashed line 193 may instead have a width in the cross-web direction that represents an overlap in the imaging areas imaged by image capturing device 143 and image capturing device 145. This overlap area, when imaged by both image capturing devices 143 and 145, would generate redundant data that could be processed and removed from the image data when generating a virtual camera array using image data provided by the image capturing devices 143 and 145 as arranged in diagram 180.

Image capturing device 147 is positioned next to and to the right of image capturing device 145 on a side of image capturing device 145 opposite image capturing device 143. Image capturing device 147 is arranged to image the areas of web 131 along imaging row 184. Imaging row 184 includes any portion of web 131 between dashed line 194 and dashed line 195 and that passes through the imaging area of image capturing device 147. In embodiments where web 131 is continuously advanced in the down-web direction generally indicated by arrow 134, the imaging area of image capturing device 147 may include any portions of the web that lie between dashed lines 194 and 195 in a cross-web dimension 132 and extending along the entirety of longitudinal dimension 133 (down-web dimension) of web 131 within imaging row 183.

As shown in diagram 180, dashed line 195 is positioned to the right of right-hand edge 159 of web 131, thus allowing the imaging area that can be imaged by image capturing device 147 to include the entirety of web 131 that lies to the right of dashed line 194, including right-hand edge 159 of the web. Further, for clarity and simplicity, dashed line 195 is shown in diagram 180 as a single line. Dashed line 194 may instead have a width in the cross-web direction that represents an overlap in the imaging areas that are imaged by image capturing device 145 and image capturing device 147. This overlap area, when imaged by both image capturing devices 145 and 147, would generate redundant data that could be processed and removed from the image data when generating a virtual camera array using image data provided by the image capturing devices 145 and 147 as arranged in diagram 180.

As illustrated in diagram 180, the portions of web 131 that are included within at least one of imaging rows 181, 182, 183, and 184 include the entirety of web 131 relative to the cross-web dimension of the web, including areas extending outside both left-hand edge 158 and right-hand edge 159 of the web. Imaging rows 181, 182, 183, and 184 may include overlap areas between the imaging rows that are illustratively represented by dashed lines 192, 193, and 194. In addition, image capturing devices 141, 143, 145, and 147 may be arranged to image all portions of web 131 within imaging rows 181, 182, 183, and 184 as the web is advanced past the imaging devices in the down-web direction indicated by arrow 134. As such, the arrangement of image capturing devices 141, 143, 145, and 147 allows for imaging of up to 100% of the area of web 131. Imaging of web 131 may include imaging and processing data associated with a pattern printed onto a surface of web 131, or otherwise incorporated into web in order to determine one or more statuses associated with the pattern, even if one or more portions of the pattern extend across more than one of imaging rows 181, 182, 183, and/or 184, (e.g., are not completely contained within just one of imaging rows 181, 182, 183 or 184 as shown in diagram 180).

For example, shape 185 as illustrated in diagram 180 is partially included within imaging row 181, and is partially included within imaging row 182, and may extend beyond any area of overlap represented by dashed line 192. As such, when imaging the portion of web 131 that includes shape 185, some portions of shape 185 will be imaged by image capturing device 141, and at least some different portions of shape 185 will be imaged by image capturing device 143. In addition, a fiducial mark 188, which may be associated with shape 185, lies completely within imaging row 181 that is imaged by image capturing device 141. Fiducial mark 188 may be a mark that provides a positional indication that is intended to be used to determine the proper location and/or dimensional aspects of shape 185 relative to web 131 and/or in general with respect to the overall shape and dimensions of shape 185.

In addition, a fiducial mark, such as fiducial mark 156, may also be printed on web 131. Fiducial mark 156, such as through a bar code, may provide positional information indicative of the physical positioning of the fiducial mark relative to the down-web position of the fiducial mark along web 131. In some embodiments, image capturing device 141 is arranged to read fiducial mark 156, and provide position data based on a reading of the fiducial mark. The position data may be received by processing circuitry 165 for use in spatial synchronization of the image data captured along each of imaging rows 181, 182, 183, and 184 by image capturing devices 141, 143, 145, and 147, respectively.

Using the image date generated by imaging web 131 along imaging row 181 and 182, the image data may be spatially synchronized using the appropriate position data to form at least some portion of a virtual camera array representative of the image data captured by image capturing devices 141 and 143. The data included in the portion of the virtual camera array formed from the image data captured by image capturing devices 141 and 143 will include image data associated with shape 185, the shape reconstructed in the virtual camera array in its entirety and with a proper relationship between the portion of shape 185 imaged by image capturing device 141 and the other portions of shape 185 imaged by image capturing device 143. In other words, a data representation of shape 185 is provided by the data incorporated into the virtual camera array generated from the image data provided by image capturing devices 141 and 143 associated with the pattern on web 131 forming shape 185.

Once the image data imaged from the portions of web 131 that included shape 185 has been spatially synchronized and processed into the virtual camera array, one or more inspection systems can analyze the data in the virtual camera array to determine various attributes associated with shape 185 and web 131. For example, the analysis of the data in the virtual camera array may be used to determine whether shape 185 as printed onto or as provided within web 131 conforms to the desired shape and/or to the required dimensions for the shape. In addition, other attributes of the area of the web included within shape 185, such as the thickness and/or color of the lines forming shape 185, freedom from defects of the portions of the web bounded within shape 185, and/or various light transmission properties of the web 131 in the area of the web included as shape 185 may be measured and compared to various threshold values to determine a status, such as a "good" or "bad" status that may be assigned to the portion of web 131 associated with shape 185. The determined status associated with shape 185 may be used later to determine whether that portion of web 131 meets the relevant requirements for use as a "part" that may be converted (separated) from web and used in a final product, such as a web cover for a display screen on a computer monitor or a mobile device such as a cellular phone.

In a similar manner, shape 186 of web 131 as shown in diagram 180 is partially included in imaging row 182 that is arranged to be imaged by image capturing device 143, and is partially included in imaging row 183 that is arranged to be imaged by image capturing device 145. Image data generated by each of image capturing devices 143 and 145 and provided to processing circuitry 165 that includes the imaged portions of web 131 that also include shape 186 may be spatially synchronized using the appropriate position data to form at least some portion of a virtual camera array representative of the image data captured by image capturing devices 143 and 145, the data including image data associated with shape 186. The image data associated with the portion of web 131 that include shape 186 include data to reconstruct shape 186 in the virtual camera array in its entirety and with a proper relationship between the portions of shape 186 that were imaged by image capturing device 143 and the other portions of shape 186 that were imaged by image capturing device 145. Similarly, fiducial mark 189, which may be associated with shape 186, may lie along dashed line 193, and, in some embodiments, may generate redundant data where fiducial mark 189 or portions of fiducial mark 189 would be imaged by both image capturing devices 143 and 145. Processing circuitry 165 may be configured to remove any redundant image data associated with fiducial mark 189, and to generate image data within the virtual camera array that properly depicts the imaging of fiducial mark 189 as the mark appeared on web 131, despite the imaging of fiducial mark 189 by both of the image capturing devices 143 and 145.

In a manner similar to that described above with respect to shape 185, a portion of shape 187, and the entirety of fiducial mark 190 that may be associated with shape 187, falls within imaging row 184, and may be imaged by image capturing device 147. A different portion of shape 187 extends beyond imaging row 184, and falls within imaging row 183, and thus may be imaged by image capturing device 145. The image data captured by both image capturing devices 145 and 147 corresponding to the portion of web 131 that included shape 187 and fiducial mark 190 may be received by processing circuitry 165, and used to generate at least a portion of the virtual camera array that that includes the imaged portions of web 131 including shape 187 spatially synchronized using the appropriate position data. The data associated with shape 187 may be reconstructed in the virtual camera array in its entirety and with a proper relationship between the portion of the shape 187 that was imaged by image capturing device 145 and the other portion of shape 186 imaged by image capturing device 147, and in proper relationship to the image data associated with fiducial mark 190.

Using the data that has been spatially synchronized to generate the virtual camera array as described throughout this disclosure, images captured from web 131 that include patterns printed on a surface of the web or other incorporated into the web may and that were captured by a plurality of image capturing devices may be combined into image data formed as a virtual camera array, including data associated with the imaged pattern or imaged patterns in their entirety. The image data arranged within the virtual camera array may then be used to determine various parameters and/or to determine one or more status(es) that may be associated with these imaged pattern(s), such as conformation of the pattern(s) to various spacing, size, shape, or other dimensional quality of the pattern. Other parameters associated with the web and/or the imaged pattern(s), such a freedom from defects in the web, and light transmission properties of the web, may also be measured and analyzed based on the image data included in the virtual camera array.

Processing circuitry 165 as shown in diagram 180 may be configured to perform any of the functions, and to provide any of the features, including the output of a virtual camera array (illustratively shown as arrow 166 in FIG. 5), described throughout this disclosure for processing circuitry 165, and any equivalents thereof. In addition, position data utilized by processing circuitry 165 to generate a virtual camera array that includes image data associated with imaging of one or more patterns printed on a surface or otherwise incorporated into a web being imaged by the image capturing devices illustrated and described with respect to diagram 180 may be captured and/or generated using any of the devices and techniques described throughout this disclosure.

Figure 6:
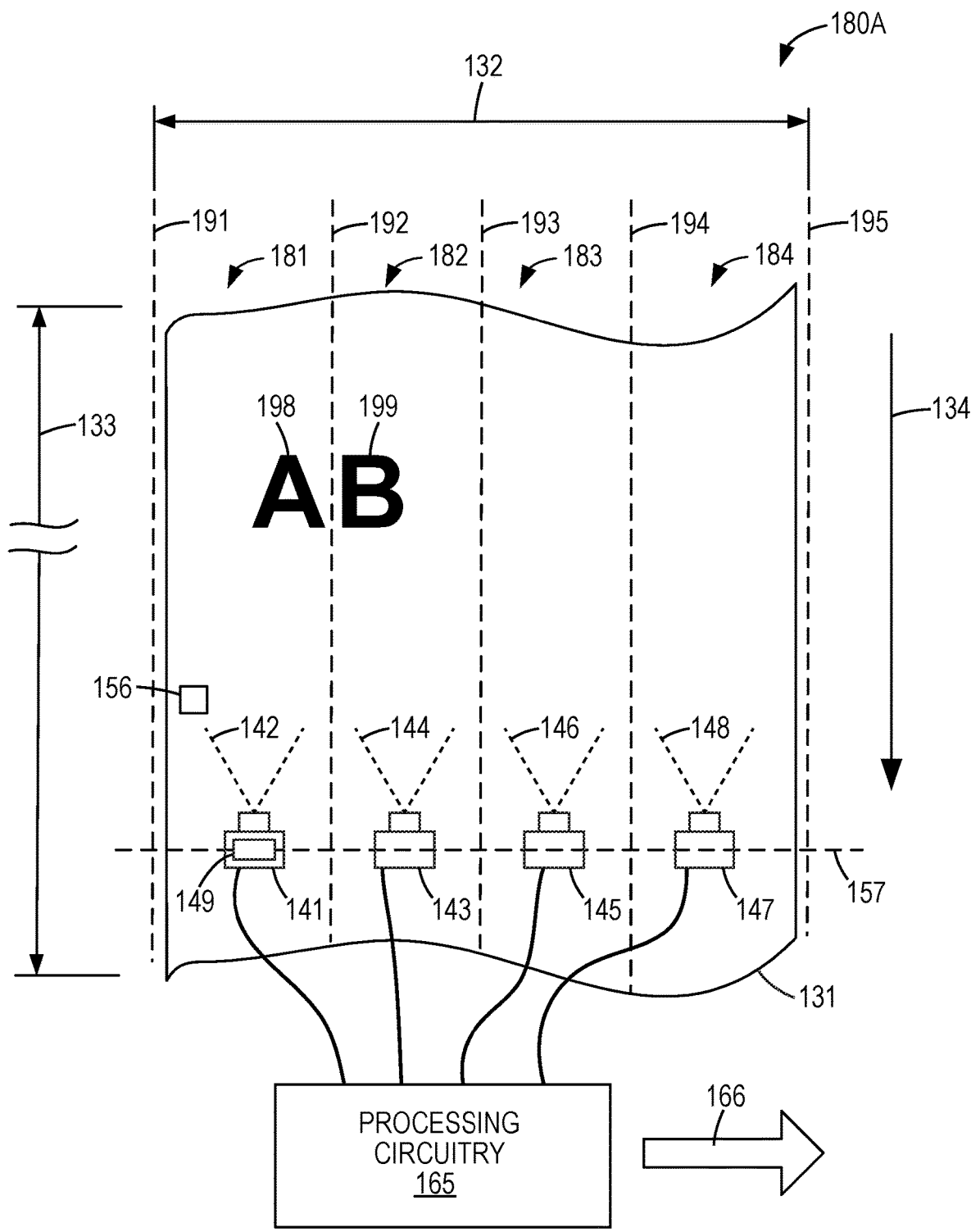
FIG. 6 is a conceptual diagram illustrative of an arrangement of image capturing devices for imaging a web that includes a pattern in accordance with one or more exemplary implementations and techniques described in this disclosure.

FIG. 6 is a conceptual diagram 180A illustrative of an arrangement of image capturing devices for imaging a web that includes a pattern in accordance with one or more exemplary implementations and techniques described in this disclosure. Diagram 180A includes the plurality of image capturing devices 141, 143, 145, and 147 arranged along a cross-web dimension 132 (axis 157) of web 131 in a manner similar to that illustrated and described with respect to diagram 180 and FIG. 5. In a manner similar that illustrated and described with respect to diagram 180 and FIG. 5, image capturing devices 141, 143, 145, and 147 may be arranged to capture image data from each of image rows 181, 182, 183 and 184, respectively of web 131 as web 131 is advanced in a direction generally indicated by arrow 134 corresponding to the down-web dimension of the web. The image data captured by each of image capturing devices 141, 143, 145, and 147 is provided to processing circuitry 165, along with position data that may be provide by imaging fiducial mark 156 of web 131. In diagram 180A as illustrated in FIG. 6, processing circuitry 165 is arranged to generate a virtual camera array including image data captured by imaging web 131, to remove redundant data and data corresponding to areas imaged that extend beyond the edges of web 131, and to spatially synchronize the image data to the associated physical potion of the imaging area were the image data was captured.

As shown in FIG. 6, web 131 includes a printed pattern including first graphical symbol 198 represented by the letter "A," and a second graphical symbol represented by the letter "B." The particular letter or other graphical symbol represented by first graphical symbol 198 and second graphical symbol 199 are not limited to any particular type of symbol, such as a particular letter or number, and may be any type of symbol, including a shape, text, number, a logo such as a company logo, or any combination thereof that may be printed on the surface of web 131, or otherwise incorporated into web 131 as a pattern. As shown in FIG. 6, first graphical symbol 198 lies within imaging row 181, and thus is positioned on web 131 to be imaged by image capturing device 141 when the portion of web 131 that includes the first graphical symbol is advanced into and through the imaging area of image capturing device 141. As further shown in FIG. 6, second graphical symbol 199 lies within imaging row 182, and thus is positioned on web 131 to be imaged by image capturing device 143 when the portion of web 131 that includes second graphical symbol 199 is advanced into and through the imaging area of image capturing device 143. As a result of imaging first graphical symbol 198 and second graphical symbol 199 as illustrated in FIG. 6, the image data associated with first graphical symbol 198 will be provided to processing circuitry 165 by a first image capturing device (i.e., image capturing device 141), and the image data associated with second graphical symbol 199 will be provided to processing circuitry 165 by a second image capturing device (i.e., image capturing device 143) different from the first image capturing device.

Because processing circuitry 165 is configured to combine the image data provide by each of image capturing devices 141 and 143 in the virtual camera array generated in response to imaging web 131, and to spatially synchronize the image data within the virtual camera array to the corresponding physical locations of the web where the image data has been captured, the virtual camera array will include image data that not only properly represents first graphical symbol 198 and second graphical symbol 199 as imaged, but also properly represents the physical positioning of both first graphical symbol 198 and the position of second graphical symbol 199 relative to their positions on web 131 and relative to each other. This feature of the image data captured by the system illustrated in diagram 180A allow analysis of the any patterns, which may include a set of graphical symbols represented by first graphical symbol 198 and second graphical symbol 199, as a whole, and in its entirety. Such analysis may be simpler and require less processing of the image data as compared to an analysis of the data represented by individual sets of image data that would instead be provided by two different image capturing devices and analyzed by two separate sets of image processing circuitry.

Figure 7:
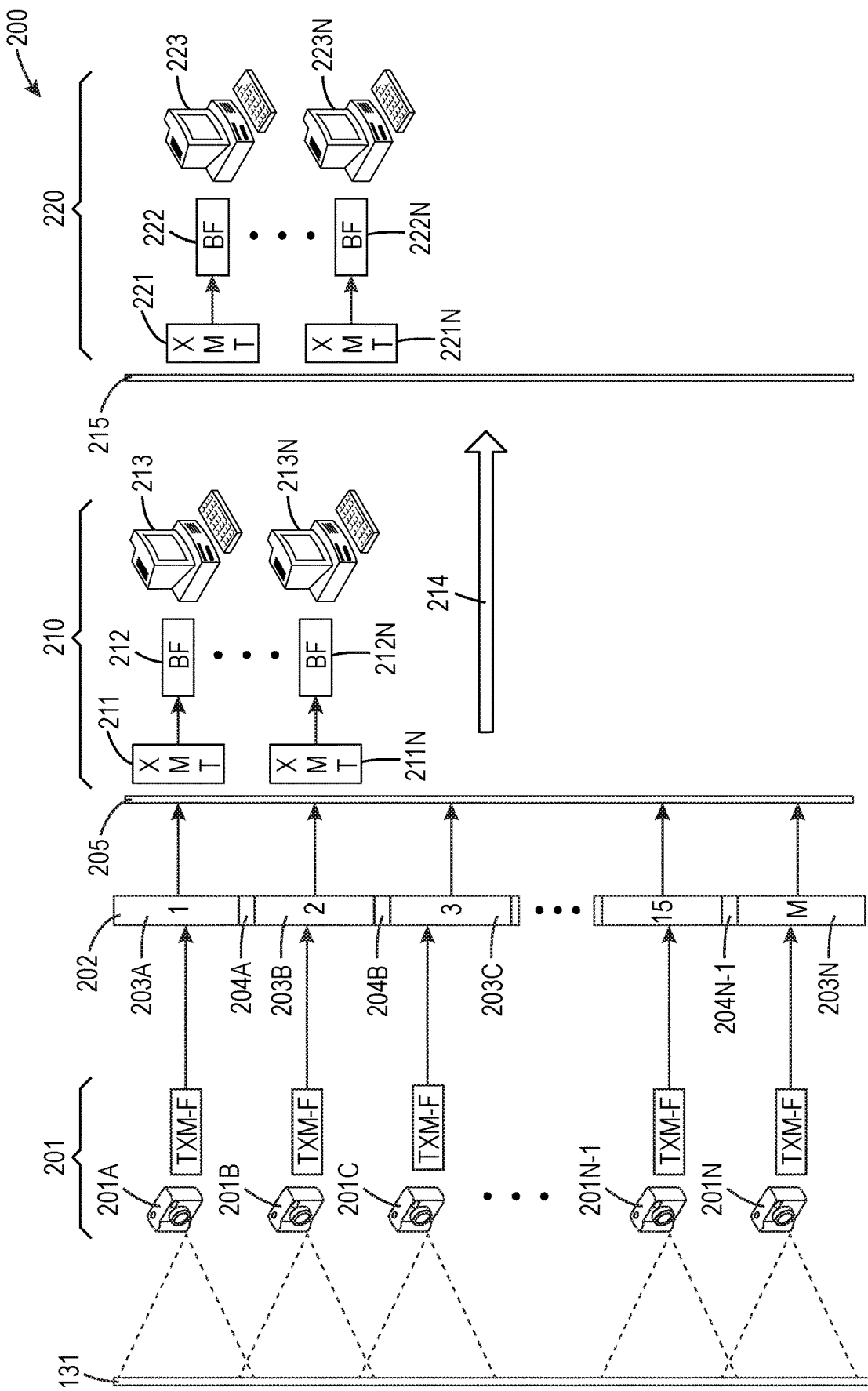
FIG. 7 is a conceptual diagram illustrative of a system for inspecting a web in accordance with one or more exemplary implementations and techniques described in this disclosure.

FIG. 7 is a conceptual diagram illustrative of system 200 for inspecting a web in accordance with one or more exemplary implementations and techniques described in this disclosure. As shown in FIG. 7, web 131 is illustratively imaged by a plurality of image capturing devices 201. Image capturing devices 201 may represent devices, such as cameras, arranged as image capturing devices 113, 113A-113N as illustrated and described with respect to FIGS. 1 and 2. Image capturing devices 201 may be configured in various physical arrangements, such as aligned along a common axis in the cross-web dimension of web 131 in a manner similar to that described with respect to image capturing device 141, 143, 145, and 147 as illustrated and described with respect to FIG. 3. Image capturing devices 201 may be configured in a staggered arrangement in a manner similar to that described with respect to image capturing devices 141, 143, 145, and 147 as illustrated and described with respect to FIG. 4, or in some other non-linear arrangement, such as an orientation that is not aligned with a cross-web dimension of web 131. Web 131 may include any type of web, such as a single layer web, or a web comprising multiple layers of material(s) layered along a thickness dimension of the web. Web 131 may include a pattern or patterns that may be printed onto a surface of the web, or otherwise incorporated within the web, wherein image capturing devices 201 are arranged to capture image data corresponding to the pattern(s) of web 131, for example, as illustrated and described with respect to FIGS. 5 and 6.

Referring again to FIG. 7, each of image capturing devices 201 is configured to image a portion of web 131, to capture image data corresponding to the imaged portion of the web, and to generate and provide as an output an image output signal corresponding to the captured image data. Each of image capturing devices 201 may be arranged to capture image data from a portion of web 131 that overlaps with a portion of the web being imaged by another one of the image capturing devices, and/or that extends beyond a left or right-hand edge of the web. The number of image capturing devices included as image capturing devices 201 is not limited to any particular number of devices, and may include two or more image capturing devices. As illustrated in FIG. 7, an integer number "N" of image capturing devices 201 are arranged to provide captured image data that was imaged from web 131. Each image capturing device provides an image output signal including image data corresponding to an imaged portion of web 131.

For example, image capturing devices 201 may include illustrative cameras 201A-201N. Camera 201A provides image data 203A for inclusion in virtual image data 202, illustrative camera 201B provides image data 203B for inclusion in virtual image data 202, illustrative camera 201C provides image data 203C for inclusion in virtual image data 202. Image data 203A includes redundant (duplicate) image data 204A overlapping with image data 203B, and image data 203B includes redundant (duplicate) image data 204B overlapping with image data 203C. Additional camera(s) that may be included in image capturing devices 201 are illustratively represented as illustrative cameras 201N-1 and 201N, and provide additional image data 203N-1 and 203N, respectively, with redundant (duplicate) image data 204N-1.

The image output signals provided by each of image capturing devices 201 are output by the image capturing devices, and received at image processing circuitry 210. Image processing circuitry 210 includes one or more computing devices, such as computing device 213, that includes processing circuitry arranged to execute programming steps to process the image output signals. Image processing circuitry 210 may include a single computing device, such as computing device 213, or may include some additional number of computing devices, illustratively represented by computing device 213N. The processing of the image output signals received at image processing circuitry 210 may be processed using only the single computing device 213 and a single image processor in some embodiments. In other embodiments, the processing of the image output signals received at image processing circuitry 210 by be performed by computing device 213 and one or more additional computing devices 213N. In some embodiments, the number of computing devices and/or processors utilized to process the image data may be configurable, and may be adjusted, for example, based on inputs provided to the system, that may change based on one or more operating parameters of the system.

For example, for high resolution settings for image capturing devices 201, and/or for faster speeds used to advance web 131 past the image capturing devices, more computing devices and/or processors may be configured to process the image data being produced by imaging web 131, thus maintaining some minimum level of throughput for the system. For lower level of resolution settings for image capturing devices 201 and/or for slower speed used to advance web 131 past the image capturing devices, a smaller number of computing devices and/or processors may be utilized as image processing circuitry 201. This feature provides system 200 with flexibility while also allowing for various configurations that would assure a minimum rate of throughput for processing the image data into the virtual camera array as further described below.

Each of the computing devices or processors included in image processing circuitry 210 may include transmit/receive circuitry 211 configured to interface with the hardware and data transmission protocols used to transmit the image output signals from image capturing devices 201. Each of computing devices included in image processing circuitry 210 may include buffer circuitry 212 coupling transmit/receive circuitry 211 with computing device 213. Any transmit/receive circuitry and/or buffer circuitry coupled to any additional computing devices, when present, are illustratively represented in FIG. 7 as transmit/receive circuitry 211N and buffer circuitry 212N, respectively.

Image processing circuitry 210 may be configured to receive the image output signals provided by image capturing devices 201, and to electronically align the individual image data provided by each of the image capturing devices to form virtual camera array 205. Alignment of the image data may include arranging the image data captured from different portions of web 131 so that the image data captured from different portions of web 131 along a same cross-web dimension of web are aligned, even though the capturing of the image data associated with these same portions of web relative to a same cross-web dimension of web may have been imaged at different times and/or by different ones of image capturing devices 201. Image processing circuitry 210 also processes virtual image data 202 to remove redundant data, illustratively shown as overlapping data 204A-204N in FIG. 5. Processing of the image output signals, including alignment of the image data and removal of redundant data, is performed by image processing circuitry 210 to generate virtual camera array 205 including captured image data corresponding to web 131.

In some embodiments, virtual camera array 205 represents image data corresponding to a plurality of "strips" of web 131 extending across the entirety of web 131 in a cross-web dimension of the web. The "strips" of image data may represent image data captured from portions of web 131 that are spaced apart from one another along a down-web dimension (longitudinal axis) of the web. In some embodiments the "strips" of image data are contiguous, and include image data extending across the entirety of the web 131 in the down-web dimension, and include all portions of the web 131 along a given portion of the web in a cross-web dimension. The given portions of the web 131 comprising the imaged portions of the web in the down-web dimension may include the entirety of the web 131 along the length of the web. The image data included in virtual camera array 205 may be spatially synchronized to the physical location of web 131 corresponding to the portion of the web 131 where the image data was taken using any of the devices and techniques described throughout this disclosure for generating position data.

Once image processing circuitry 210 has generated virtual camera array 205, the data included in the virtual camera array may be forwarded on to one or more inspection systems 220, as illustratively represented by arrow 214 in FIG. 5. In some embodiments, image processing circuitry 210 may perform one or more pre-processing operations on virtual camera array 205 before forwarding the virtual camera array 205 to inspection system 220. Pre-processing of virtual camera array 205 may include one or some combination of performing one-dimensional or two-dimensional spatial convolutions, ranked filtering (median), contrast enhancement, static flat-field correction, difference of filtered images processing, and/or frequency processing on the image data including within the virtual camera array. Examples of spatial convolutions that may be used to pre-process the image data in the virtual camera array may include neighborhood averaging, Gaussian kernels gradient filtering, and/or directional edge enhancement. Examples of difference of filtered image processing may include processing based on difference of Gaussians for the image data. Examples of frequency transforms may include processing in frequency space to remove artifacts and then application of an inverse transform. Pre-processing of the image data may include spatial pattern matching. The virtual camera array, as forwarded to inspection systems 220 is illustratively represented virtual camera array 215 in FIG. 7.

Inspection system 220 may include one or more computing devices, illustratively represented as computing devices 223 through 223N, that are configured to receive the data provided by the virtual camera array, and to perform analysis on the data. Analysis of the data in the virtual camera array is not limited to any particular type of analysis, and may include any type of analysis directed at determining values for various measurements related to a physical and/or functional characteristic of web 131, and/or to assign one or more statuses, such as a pass/fail status, to portions of or to the entirety of web 131 based on the analyzed data. Inspection system 220 may include transmit/receive circuitry, illustratively represented as transceiver circuitry 221-221N, configured to allow transmission of virtual camera array 215 from image processing circuitry 210 to the computing devices of inspection system 220, which may also be coupled through buffer circuitry that is illustratively represented as buffer circuitry 222-222N in FIG. 7.

The analysis of the data within virtual camera array 215 may be used to determine what types of defects, such as surface defects, might exist in the web, and the physical location(s) of any such defects. The analysis of the data within virtual camera array 215 may be used to determine a status, such as a "good" or "bad" status, associated with the inspected portions of the web in its entirety, or for example with respect to individual portions of the web, such as but not limited to portions of the web that include patterns printed on or otherwise incorporated within the web. Analysis of the data included within virtual camera array 215 is not limited to these embodiments, or to any particular type of analysis, and may include any type of analysis that is deemed relevant to the inspection of web 131 and that may be analyzed based on the data included within virtual camera array 215 associated with the imaging of web 131.

Figure 8:
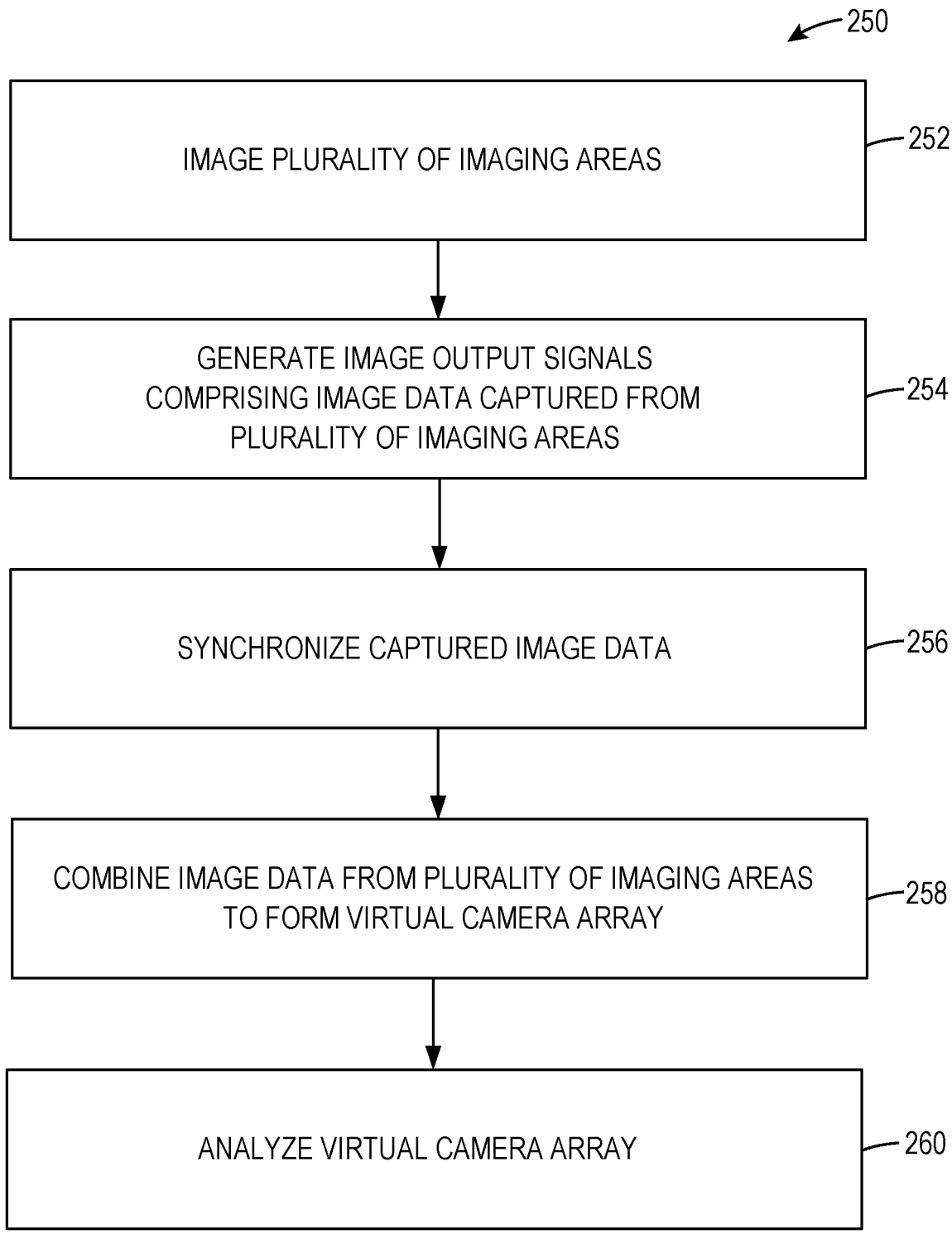
FIG. 8 is a flowchart illustrating an exemplary method in accordance with various techniques described in this disclosure.

FIG. 8 is a flowchart illustrating exemplary method 250 in accordance with various techniques described in this disclosure. Method 250 is described below as being performed by system 200 including image capturing devices 201, image processing circuitry 210, and inspection system 220 as illustrated and described with respect to FIG. 7. Execution of one or more of the processes described below in association with method 250 are not limited to being performed exclusively by these particular devices, and, in some embodiments, may be performed, in part or in its entirety, by devices other than image capturing devices 201, image processing circuitry 210, and/or by inspection system 220.

Method 250 includes image capturing devices 201 imaging a plurality of imaging areas of a web while the web is advanced through an imaging apparatus in a down-web dimension of the web (block 252). The imaging areas may extend across the web along the entirety of the web in a cross-web dimension. In some embodiments, the imaging areas may align with one another along a common axis of the web in the cross-web dimension. In some embodiments the imaging area may form a staggered pattern relative to the down-web dimension of the web. The image capturing devices may include devices, such as a plurality of cameras, that includes an image sensor configure to receive light in the form of captured images and to convert the received light into electrical signals corresponding to the captured images.

Method 250 further includes generating, by the plurality of image capturing devices 201, image output signals comprising image data captured from each of the plurality of imaging areas of the web (block 254). The image output signals in some embodiments includes raw video data. In other embodiments, the image output signals include image data that was further processed from the raw video data by the image capturing devices.

Method 250 includes synchronizing, by image processing circuitry 210, the image data captured by the plurality of image capturing devices 201 and corresponding respectively to each of the plurality of imaging areas of the web (block 256). Synchronization of the image data may include spatially synchronization of the image data to the corresponding physical location of web 131 where the image data was taken using position information associated with at least the down-web dimension of the web.

Method 250 includes image processing circuitry 210 combining the image data received from the plurality of image capturing devices 201 to remove redundant data from the combined image data to generate a virtual camera array (block 258). The virtual camera array corresponds to the image data captured for the imaged portions of the web, and having the redundant data removed. In some embodiments, image processing circuitry 210 may perform one or more pre-processing operations on the virtual camera array. Pre-processing operations that may be performed by image processing circuitry 210 include but are not limited to performing one-dimensional or two-dimensional convolutions, ranked filtering, contrast enhancement, static flat-field correction, and/or frequency processing on the image data including within the virtual camera array.

Method 250 includes analyzing, by one or more inspection systems, the image data included in the virtual camera array (block 260). Analysis of the image data included in the virtual camera array may include analysis to determine if and where any defects exist in the web. Analysis of the web may include analysis to determine one or more inspection statuses for the web. Inspection statuses determined for the web may include assigning a pass/fail status for one or more portions of the inspected web, and/or a pass/fail status assigned to the entirety of the inspected web, for example, to an entire roll of web that was inspected and analyzed using any of the imaging/and analysis techniques described herein. Analysis of the web may include analysis of the image data included within the virtual camera array corresponding to a pattern or patterns included on a surface or otherwise incorporated into the web to determine conformance of the pattern(s) to one or more requirements related to parameters that may be associated with the pattern(s), such as a shape, positioning, color, or other characteristics of the pattern(s) of the web included within the portions of the web that include the pattern(s).

Figure 9:
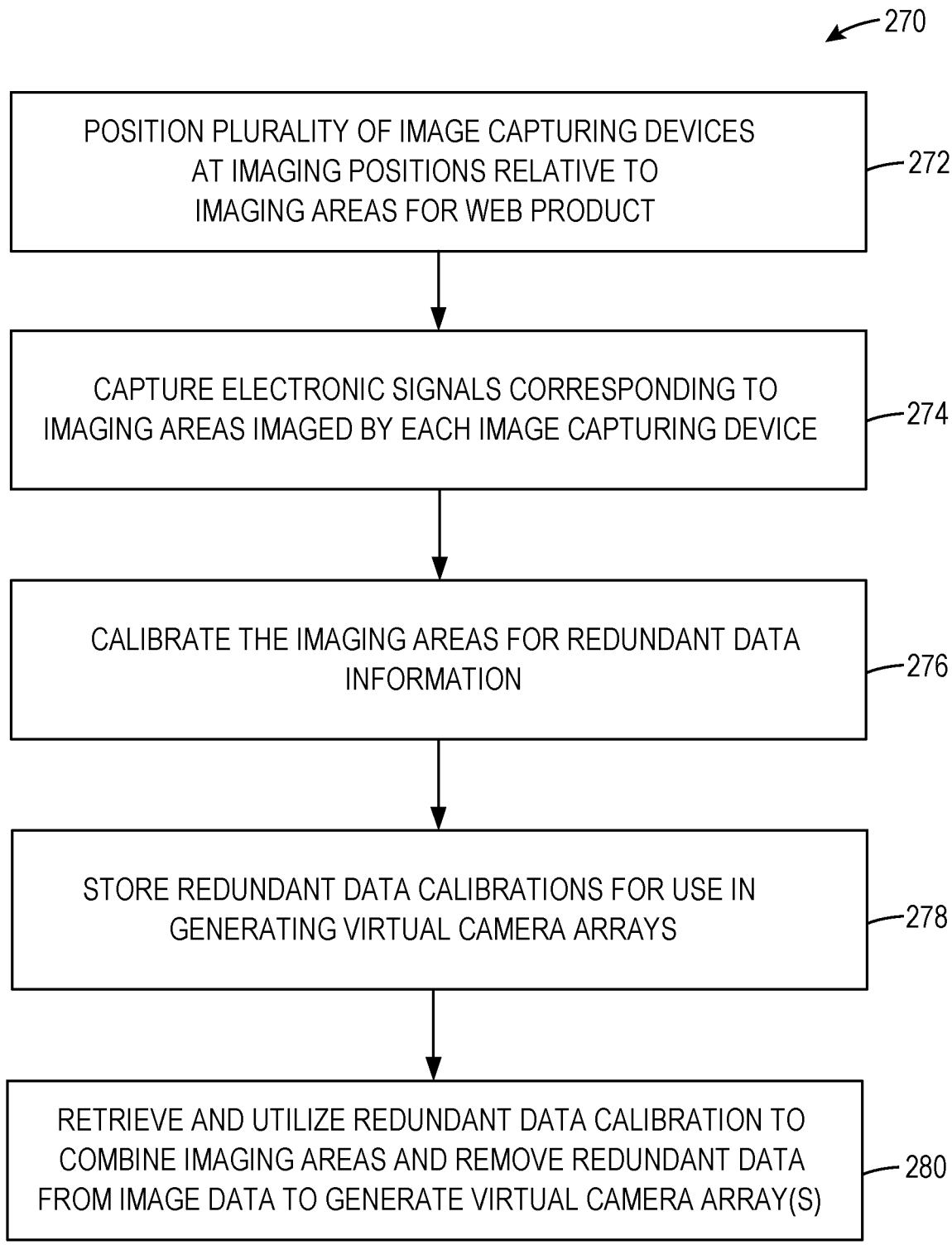
FIG. 9 is a flowchart illustrating another exemplary method in accordance with various techniques described in this disclosure.

FIG. 9 is a flowchart illustrating another exemplary method 270 in accordance with various techniques described in this disclosure. Method 270 is described below as being performed by system 200 including image capturing devices 201, image processing circuitry 210, and inspection system 220 as illustrated and described with respect to FIG. 7. Execution of one or more of the processes described below in association with method 270, however, are not limited to being performed exclusively by these particular devices, and, in some embodiments, may be performed, in part or in its entirety, by devices other than image capturing devices 201, image processing circuitry 210, and/or by inspection system 220.

Method 270 includes positioning a plurality of image capturing devices 201 at imaging positions relative to imaging areas of a web (block 272). In some embodiments, positioning the plurality of image capturing devices 201 includes aligning image capturing devices 201 along a common axis. In some embodiments, the common axis of alignment for the plurality of image capturing devices 201 has an axis of orientation that corresponds to a same orientation as the cross-web dimension of the web. In other embodiments, the common axis of alignment of the plurality of image capturing devices 201 has an axis of orientation that is different from the orientation of the cross-web dimension of the web. When aligned along a common axis, the imaging areas that may be imaged by each of image capturing devices 201 may also align along a common imaging axis, and may include one or more overlapping image areas of the web that may be imaged by more than one of the plurality of image capturing devices 201 along the common imaging axis of the imaging areas.

In some embodiments, the positioning of the plurality of image capturing devices 201 includes a staggered pattern of alignment. In some embodiments, a first subset of the plurality of image capturing devices is aligned along a first camera axis of orientation, and second subset of the plurality of image capturing devices that includes only image capturing devices not included in the first subset of the plurality of image capturing devices 201 is aligned along a second camera axis of orientation that is separated by a non-zero value distance for the first camera axis. In some embodiments, both the first camera axis and the second camera axis of orientation both have an orientation that is the same orientation as the cross-web dimension of web 131.

In some embodiments, the positioning of the image capturing devices includes positioning the image capturing devices so that the imaging areas for the at least one image capturing device extends past a first edge (e.g., a left-hand edge) of the web relative to the cross-web dimension of the web, and at least a second one of the plurality of image capturing devices is positioned so that the imaging area of the second image capturing devices extends past a second edge (e.g., a right-hand edge) opposite the first edge of the web relative to the cross-web dimension of the web.

Method 270 includes capturing electronic signals corresponding to the imaging areas imaged by each of the plurality of image capturing devices (block 274). The capturing of the electronic signals includes use of any type of devices and circuitry, such as image sensor arrays, configured to image a portion of web 131, to generate and electronic signal corresponding to the imaging, and to generate and provide as an output electronic signal corresponding to the image data generated in response to the imaging of the imaging area.

Method 270 includes calibrating the image data provided as the captured electronic signals for redundant data information (block 276). Calibrating of the image data may be performed by processing circuitry included within one or more computing devices of image processing circuitry 210. Calibration of the image data to remove redundant data includes determining areas of overlap wherein the imaging areas of two or more of the plurality of image capturing devices are aligned to image a same area of web 131 at a same time or at different times as the web is advanced past the image capturing device, and designate the overlap areas as generating a duplication of image data related to a same portion of web 131. Calibration of the image data to remove redundant data includes determining any areas of crossover wherein the imaging areas of two or more of the plurality of image capturing devices may not directly overlap, but may crossover one another relative to the cross-web dimension of the web, and to designate these crossover areas as generating a duplication of image data related to a same portion of web 131. Calibration of image data to remove redundant data may further include determining areas including in one or more of the imaging areas that extend beyond an edge of the web in a cross-web dimension of the web, and designating of the image data corresponding to these areas that extend beyond an edge of the web as image data to be removed from virtual camera array that may be generated from the image data generated by image processing circuitry 210.

Method 270 includes storing the redundant data calibrations for use in generating a virtual camera array associated with any image data generated by the plurality of image capturing devices 201 when imaging web 131 (block 278). In some embodiments, the redundant data calibrations may be stored in a memory device included in at least one of the computing devices included in image processing circuitry 210.

Method 270 includes retrieving and utilizing the redundant data calibrations to combine imaging areas and to remove redundant data from the combined imaging areas to generate a virtual camera array corresponding to the imaging areas (block 280). In some embodiments, image processing circuitry 210 retrieves the redundant data calibrations stored in a memory device, and utilizes the redundant data calibrations to process the image data received from the plurality of image capturing devices 201 as the image capturing devices image web 131. Processing of the image data includes removal the duplication of redundant data generated by image capturing devices 201 in any overlapping or any crossover portions of the imaging areas being imaged by the image capturing devices based on the redundant data calibrations. Processing of the image data may include removal of image data associated with portions of the imaging areas the extend beyond the edges of web 131 being imaged by image capturing devices 201.

Processing the image data includes generation of a virtual camera array corresponding to the imaging areas being imaged by image capturing devices 201, with redundant data and any data associated with imaging areas that extend beyond the edges of web 131 removed. In some, embodiments, processing of the image data by image processing circuitry 210 includes any of the pre-processing procedure(s) as described throughout this disclosure, or any equivalents thereof. In some embodiments, generating the virtual camera array includes generating the image data including in the virtual camera array in real time as the electronic signals generated by image capturing devices 201 are received by image processing circuitry 210.

The techniques of this disclosure may be implemented in a wide variety of computing devices, image capturing devices, and various combinations thereof. Any of the described units, modules or components may be implemented together or separately as discrete, but interoperable logic devices. Depiction of different features as modules, devices, or units is intended to highlight different functional aspects and does not necessarily imply that such modules, devices, or units must be realized by separate hardware or software components. Rather, functionality associated with one or more modules, devices, or units may be performed by separate hardware or software components, of integrated within common or separate hardware or software components. The techniques described in this disclosure may be implemented, at least in part, in hardware, software, firmware or any combination thereof.

For example, various aspects of the techniques may be implemented within one or more microprocessors, digital signal processors (DSPs), application specific integrated circuits (ASICs), field programmable gate arrays (FPGAs), or any other equivalent integrated or discrete logic circuitry, as well as any combinations of such components, embodied in for example, in the image capturing devices, the processing circuitry, computing devices, and inspection systems used to capture, process, and/or analyze the image data and including the image data generated as the virtual camera array as described in this disclosure, and any equivalents thereof. The terms "processor," "processing circuitry," "controller" or "control module" may generally refer to any of the foregoing logic circuitry, alone or in combination with other logic circuitry, or any other equivalent circuitry, and alone or in combination with other digital or analog circuitry.

For aspects implemented in software, at least some of the functionality ascribed to the systems and devices described in this disclosure may be embodied as instructions on a computer-readable storage medium such as random-access memory (RAM), read-only memory (ROM), non-volatile random-access memory (NVRAM), electrically erasable programmable read-only memory (EEPROM), FLASH memory, magnetic media, optical media, or the like that is tangible. The computer-readable storage media may be referred to as non-transitory. A server, client computing device, or any other computing device may also contain a more portable removable memory type to enable easy data transfer or offline data analysis. The instructions may be executed to support one or more aspects of the functionality described in this disclosure. In some embodiments, a computer-readable storage medium comprises non-transitory medium. The term "non-transitory" may indicate that the storage medium is not embodied in a carrier wave or a propagated signal. In certain embodiments, a non-transitory storage medium may store data that can, over time, change (e.g., in RAM or cache).

Various aspects of this disclosure have been described. These and other aspects are within the scope of the following claims.

What is claimed is:

1. A method for inspecting a web, the method comprising:
   imaging, by each of a plurality of image capturing devices, a plurality of imaging areas extending across a cross-web dimension of the web while the web is advanced along a down-web dimension of the web;
   generating, by the plurality of image capturing devices, image output signals comprising image data captured by each of the plurality of image capturing devices and corresponding respectively to each of the plurality of imaging areas extending across the cross-web dimension of the web;
   aligning, by processing circuitry, the image data corresponding to the plurality of imaging areas extending across the cross-web dimension of the web to generate virtual image data corresponding to a virtual image area of the web that extends across the cross-web dimension of the web at a same down-web dimensional position of the web;
   combining, by the processing circuitry, the image data from the plurality of imaging areas to remove redundant data from the virtual image area and to generate a virtual camera array corresponding to image data captured from the plurality of imaging areas of the web;
   pre-processing the virtual camera array by applying, by the processing circuitry, at least one of one-dimensional or two-dimensional filtering, ranked filtering, pass-through, contrast enhancement, and static flat-field correction to the virtual camera array; and
   analyzing, by at least one inspection system, the virtual camera array to determine at least one inspection status for the web, at least in part by detecting, by the at least one inspection system, a pattern printed on the web, the pattern spanning at least two adjacent image areas of the image areas in the cross-web direction.

2. The method of claim 1, wherein at least a subset of the imaging areas is aligned along the cross-web dimension of the web, and wherein each of the subset of imaging areas overlaps with at least one other imaging area of the subset of imaging areas along the cross-web dimension of the web.

3. The method of claim 1, wherein at least a subset of the imaging areas form a staggered pattern extending along the down-web dimension of the web, and wherein no imaging area of the subset of imaging areas overlaps with any other imaging are of the subset of imaging areas along the cross-web dimension of the web, the method further comprising aligning, by the processing circuitry, the image data corresponding to the subset of the imaging areas in the down-web dimension to generate the virtual image data corresponding to the virtual image area of the web.

4. The method of claim 1, wherein the image output signals generated by the plurality of image capturing devices comprise raw video data.

5. The method of claim 1, wherein analyzing the virtual camera array with the at least one inspection system comprises:
   determining, by the processing circuitry, a number of inspection systems to be used to process the image output signals; and
   analyzing, by the processing circuitry, the virtual camera array using the determined number of inspection systems to determine the at least one inspection status for the web.

6. The method of claim 1, wherein the at least one inspection system comprises a single inspection system.

7. The method of claim 1, the at least one inspection system comprises a number of inspection systems that is less than a number of image capturing devices included in the plurality of image capturing devices.

8. The method of claim 1, wherein the at least one inspection system utilized to analyze the virtual camera array comprises a number of inspection systems that is based at least in part on a resolution rate for imaging the plurality of imaging areas and a rate of movement of the web in the down-web dimension as the web is advanced.

9. A system for inspecting a web, the system comprising:
   a web inspection station configured to advance the web through a processing line along a down-web dimension of the web past an imaging station;
   a plurality of image capturing devices positioned at the web inspection station and configured to image a plurality of imaging areas extending in a cross-web dimension of the web while the web is advanced through the imaging station along the down-web dimension, and to generate image output signals comprising image data captured by each of the plurality of image capturing devices and corresponding respectively to each of the plurality of imaging areas extending across the cross-web dimension of the web;
   processing circuitry communicatively coupled to the plurality of image capturing devices, the processing circuitry being configured to:
   spatially synchronize the image data corresponding to the plurality of imaging areas extending across the cross-web dimension of the web to generate virtual image data corresponding to a virtual image area of the web that extends across the cross-web dimension of the web at a same down-web dimensional position of the web, and
   combine the image data from the plurality of imaging areas to remove redundant data from the virtual image area and to generate a virtual camera array corresponding to image data captured from the plurality of imaging areas of the web;
   pre-process the virtual camera array by applying, by the processing circuitry, at least one of one-dimensional or two-dimensional filtering, ranked filtering, pass-through, contrast enhancement, and static flat-field correction to the virtual camera array; and
   at least one inspection system configured to analyze the virtual camera array to determine at least one inspection status for the web at least in part by detecting a pattern printed on the web, the pattern spanning at least two adjacent image areas of the image areas in the cross-web direction.

10. The system of claim 9, wherein at least a subset of the imaging areas is aligned along the cross-web dimension of the web, and wherein each of the subset of imaging areas overlaps with at least one other imaging area of the subset of imaging areas along the cross-web dimension of the web.

11. The system of claim 9, wherein at least a subset of the imaging areas form a staggered pattern extending along the down-web dimension of the web, and wherein no imaging area of the subset of imaging areas overlaps with any other imaging are of the subset of imaging areas along the cross-web dimension of the web, the processing circuitry being further configured to align the image data corresponding to the subset of the imaging areas in the down-web dimension to generate the virtual image data corresponding to the virtual image area of the web.

12. The system of claim 9, wherein at least one of the plurality of image capturing devices comprises either a line-scan camera or an area-scan camera.

13. The system of claim 9, wherein the at least one inspection system includes a number of inspection systems that is less than a number of image capturing devices included in the plurality of image capturing devices.

14. The system of claim 9, wherein to analyze the virtual camera array, the at least one inspection system is configured to:
   detect a pattern printed on the web, the pattern spanning at least two adjacent image areas of the image areas in the cross-web direction; and
   verify that the detected pattern spans the at least two adjacent image areas of the images areas in the cross-web direction.

15. A method for inspecting a web including a printed pattern on the web, the method comprising:
   imaging, by each of a plurality of image capturing devices, a plurality of imaging areas extending across a cross-web dimension of the web and along an imaging row in a down-web dimension while the web is advanced in a processing line along a down-web dimension of the web;
   generating, by the plurality of image capturing devices, image output signals comprising image data captured by each of the plurality of image capturing devices and corresponding to each of the plurality of imaging areas extending across the cross-web dimension of the web extending along the imaging rows for each of the image capturing devices;
   aligning, by processing circuitry, the image data corresponding to the plurality of imaging areas that align with one another extending across the cross-web dimension of the web to generate image data corresponding to a virtual image area of the web that extends across the cross-web dimension of the web at a same down-web dimensional position of the web and that aligns the image data corresponding to the printed pattern of the web in a same relative position as the printed pattern on the web;

combining, the processing circuitry, the image data from the plurality of imaging areas to remove redundant data from the virtual image area and to generate a virtual camera array corresponding to image data captured from the plurality of imaging areas of the web;

pre-processing the virtual camera array by applying, by the processing circuitry, at least one of one-dimensional or two-dimensional filtering, ranked filtering, pass-through, contrast enhancement, and static flat-field correction to the virtual camera array; and analyzing, by at least one inspection system, the virtual camera array to determine at least one inspection status for the printed pattern included with the web, at least in part by detecting, by the at least one inspection system, a pattern printed on the web, the pattern spanning at least two adjacent image areas of the image areas in the cross-web direction.

16. The method of claim 15, wherein the printed pattern comprises a plurality of outlines of shapes, each shape defining a perimeter for a part to be converted from the web.

* * * * *

UNITED STATES PATENT AND TRADEMARK OFFICE
CERTIFICATE OF CORRECTION

| | | |
|---|---|---|
| PATENT NO. | : 11,585,762 B2 | Page 1 of 1 |
| APPLICATION NO. | : 16/965647 | |
| DATED | : February 21, 2023 | |
| INVENTOR(S) | : Kenneth Gene Brittain | |

It is certified that error appears in the above-identified patent and that said Letters Patent is hereby corrected as shown below:

In the Claims

<u>Column 38</u>

Line 21, in Claim 11, delete "imaging are" and insert -- imaging area --, therefor.

Line 41, in Claim 14, delete "images areas in the cross-web direction" and insert -- image areas in the cross-web direction --, therefor.

Signed and Sealed this
Second Day of April, 2024

Katherine Kelly Vidal
*Director of the United States Patent and Trademark Office*